US008121038B2

(12) United States Patent
Bergamasco et al.

(10) Patent No.: US 8,121,038 B2
(45) Date of Patent: Feb. 21, 2012

(54) BACKWARD CONGESTION NOTIFICATION

(75) Inventors: Davide Bergamasco, Sunnyvale, CA (US); Dinesh Dutt, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 298 days.

(21) Appl. No.: 11/842,866

(22) Filed: Aug. 21, 2007

(65) Prior Publication Data

US 2009/0052326 A1 Feb. 26, 2009

(51) Int. Cl.
*H04J 3/14* (2006.01)

(52) U.S. Cl. ........................................................ 370/236

(58) Field of Classification Search ........... 370/229–240
See application file for complete search history.

(56) References Cited

U.S. PATENT DOCUMENTS 5,402,416 A 3/1995 Cieslak et al.
5,526,350 A 6/1996 Gittins et al.
5,742,604 A 4/1998 Edsall et al.
5,920,566 A 7/1999 Hendel et al.
5,946,313 A 8/1999 Allan et al.
5,974,467 A 10/1999 Haddock et al.
6,021,124 A 2/2000 Haartsen
6,104,699 A 8/2000 Holender et al.
6,195,356 B1 2/2001 Anello et al.
6,201,789 B1 * 3/2001 Witkowski et al. ........... 370/230
6,333,917 B1 12/2001 Lyon et al.
6,397,260 B1 5/2002 Wils et al.
6,404,768 B1 6/2002 Basak et al.
6,414,939 B1 * 7/2002 Yamato ...................... 370/236.1
6,456,590 B1 9/2002 Ren et al.
6,459,698 B1 10/2002 Achrya
6,504,836 B1 1/2003 Li et al.
6,529,489 B1 3/2003 Kikuchi et al.
6,556,541 B1 4/2003 Bare
6,556,578 B1 4/2003 Silberschatz et al.
6,560,198 B1 5/2003 Ott et al.
6,587,436 B1 7/2003 Vu et al.
6,636,524 B1 10/2003 Chen et al.

(Continued)

FOREIGN PATENT DOCUMENTS

CN 1778079 A 5/2006

(Continued)

OTHER PUBLICATIONS

PCT Search Report mailed Sep. 27, 2007, from International Application No. PCT/US06/38858, including Notification of Transmittal, (4 pp.).

(Continued)

*Primary Examiner* — Kwang B Yao
*Assistant Examiner* — Tung Q Tran
(74) *Attorney, Agent, or Firm* — Weaver Austin Villeneuve & Sampson LLP

(57) ABSTRACT

In one embodiment, an apparatus comprises a network interface system having at least one input port configured for receiving frames and a logic system comprising at least one logic device. The logic system may be configured to perform the following functions: determining a source address and a destination address of a frame received at an ingress port; calculating a flow hash based at least upon the source address and the destination address; forming a congestion management ("CM") tag that includes the flow hash; inserting the CM tag in the frame; and forwarding the frame to the destination address.

41 Claims, 18 Drawing Sheets

U.S. PATENT DOCUMENTS 6,650,623 B1 11/2003 Varma et al.
6,671,258 B1 12/2003 Bonneau
6,721,316 B1 4/2004 Epps et al.
6,724,725 B1 4/2004 Dreyer et al.
6,839,794 B1 1/2005 Schober
6,885,633 B1 4/2005 Mikkonen
6,888,824 B1 5/2005 Fang et al.
6,901,593 B2 5/2005 Aweya et al.
6,904,507 B2 6/2005 Gil
6,922,408 B2 7/2005 Bloch et al.
6,934,256 B1 8/2005 Jacobson et al.
6,934,292 B1 8/2005 Ammitzboell
6,975,581 B1 12/2005 Medina et al.
6,975,593 B2 12/2005 Collier et al.
6,990,529 B2 1/2006 Yang et al.
6,999,462 B1 2/2006 Acharaya
7,016,971 B1 3/2006 Recio et al.
7,020,715 B2 3/2006 Venkataraman et al.
7,046,631 B1 5/2006 Giroux et al.
7,046,666 B1 5/2006 Bollay et al.
7,047,666 B2 5/2006 Hahn et al.
7,093,024 B2 8/2006 Craddock et al.
7,133,405 B2 11/2006 Graham et al.
7,133,416 B1 11/2006 Chamdani
7,158,480 B1 1/2007 Firoiu et al.
7,187,688 B2 3/2007 Garmire et al.
7,190,667 B2 3/2007 Susnov et al.
7,197,047 B2 3/2007 Latif et al.
7,209,478 B2 4/2007 Rojas et al.
7,209,489 B1 4/2007 Bailey et al.
7,221,656 B1 5/2007 Aweya et al.
7,225,364 B2 5/2007 Carnevale et al.
7,266,122 B1 9/2007 Hogg et al.
7,266,598 B2 9/2007 Rolia
7,277,391 B1 10/2007 Aweya et al.
7,286,485 B1 10/2007 Oulette et al.
7,319,669 B1 1/2008 Kunz et al.
7,349,334 B2 3/2008 Rider
7,349,336 B2 3/2008 Mathews et al.
7,359,321 B1 4/2008 Sindhu et al.
7,385,997 B2 6/2008 Gorti et al.
7,400,590 B1 7/2008 Rygh et al.
7,400,634 B2 7/2008 Higashitaniguchi et al.
7,406,092 B2 7/2008 Dropps et al.
7,436,845 B1 10/2008 Rygh et al.
7,486,689 B1 2/2009 Mott
7,525,983 B2 4/2009 Dropps et al.
7,529,243 B2 5/2009 Sodder et al.
7,561,571 B1 7/2009 Lovett et al.
7,564,789 B2 7/2009 Betker
7,564,869 B2 7/2009 Cafiero et al.
7,596,627 B2 9/2009 Cometto et al.
7,602,720 B2 10/2009 Bergamasco et al.
7,684,326 B2 3/2010 Nation et al.
7,801,125 B2 9/2010 Kreeger et al.
7,830,793 B2 11/2010 Gai et al.
7,961,621 B2 6/2011 Bergamasco et al.
7,969,971 B2 6/2011 Gai et al.
2001/0043564 A1 11/2001 Bloch et al.
2001/0048661 A1 12/2001 Clear et al.
2002/0046271 A1 4/2002 Huang
2002/0085493 A1 7/2002 Pekkala et al.
2002/0085565 A1 7/2002 Ku et al.
2002/0103631 A1 8/2002 Feldmann et al.
2002/0141427 A1 10/2002 McAlpine
2002/0159385 A1 10/2002 Susnow et al.
2002/0188648 A1 12/2002 Aweya et al.
2002/0191640 A1 12/2002 Haymes et al.
2003/0002517 A1 1/2003 Takajitsuko et al.
2003/0026267 A1 2/2003 Obermann et al.
2003/0037127 A1 2/2003 Shah et al.
2003/0037163 A1 2/2003 Kitada et al.
2003/0061379 A1 3/2003 Craddock et al.
2003/0084219 A1 5/2003 Yao et al.
2003/0091037 A1 5/2003 Latif et al.
2003/0115355 A1 6/2003 Cometto et al.
2003/0118030 A1 6/2003 Fukuda
2003/0152063 A1 8/2003 Giese et al.
2003/0169690 A1 9/2003 Mott
2003/0193942 A1 10/2003 Gil
2003/0195983 A1 10/2003 Krause
2003/0202536 A1 10/2003 Foster et al.
2003/0223416 A1 12/2003 Rojas et al.
2003/0227893 A1 12/2003 Bajic
2004/0008675 A1 1/2004 Basso et al.
2004/0013088 A1 1/2004 Gregg
2004/0013124 A1 1/2004 Peebles et al.
2004/0024903 A1 2/2004 Costatino et al.
2004/0032856 A1 2/2004 Sandstrom
2004/0042448 A1 3/2004 Lebizay et al.
2004/0042477 A1 3/2004 Bitar et al.
2004/0076175 A1 4/2004 Patenaude
2004/0078621 A1 4/2004 Talaugon et al.
2004/0081203 A1 4/2004 Sodder et al.
2004/0100980 A1 5/2004 Jacobs et al.
2004/0120332 A1 6/2004 Hendel
2004/0156390 A1 8/2004 Prasad et al.
2004/0196809 A1 10/2004 Dillinger et al.
2004/0213243 A1 10/2004 Lin et al.
2004/0240459 A1 12/2004 Lo et al.
2005/0002329 A1 1/2005 Luft et al.
2005/0018606 A1 1/2005 Dropps et al.
2005/0025179 A1 2/2005 McLaggan et al.
2005/0047421 A1 3/2005 Solomon
2005/0060445 A1 3/2005 Beukema et al.
2005/0138243 A1 6/2005 Tierney et al.
2005/0141419 A1 6/2005 Bergamasco et al.
2005/0141568 A1 6/2005 Kwak et al.
2005/0169188 A1 8/2005 Cometto et al.
2005/0169270 A1 8/2005 Mutou et al.
2005/0190752 A1 9/2005 Chiou et al.
2005/0226149 A1 10/2005 Jacobson et al.
2005/0238064 A1 10/2005 Winter et al.
2006/0002385 A1 1/2006 Johnsen et al.
2006/0023708 A1 2/2006 Snively
2006/0059213 A1 3/2006 Evoy
2006/0087989 A1 4/2006 Gai et al.
2006/0098589 A1* 5/2006 Kreeger et al. ............... 370/256
2006/0098681 A1 5/2006 Cafiero et al.
2006/0101140 A1 5/2006 Gai et al.
2006/0146832 A1 7/2006 Rampal et al.
2006/0171318 A1 8/2006 Bergamasco et al.
2006/0187832 A1 8/2006 Yu
2006/0198323 A1 9/2006 Finn
2006/0215550 A1* 9/2006 Malhotra ...................... 370/229
2006/0251067 A1 11/2006 DeSanti et al.
2007/0041321 A1* 2/2007 Sasaki et al. .................. 370/235
2007/0047443 A1 3/2007 Desai et al.
2007/0081454 A1 4/2007 Bergamasco et al.
2007/0115824 A1* 5/2007 Chandra et al. ............... 370/235
2007/0121617 A1 5/2007 Kanekar et al.
2007/0183332 A1* 8/2007 Oh et al. ....................... 370/236
2008/0069114 A1* 3/2008 Shimada .................. 370/395.31
2008/0089247 A1 4/2008 Sane et al.
2008/0186968 A1 8/2008 Farinacci et al.
2008/0212595 A1 9/2008 Figueira et al.
2008/0259798 A1 10/2008 Loh et al.
2008/0273465 A1 11/2008 Gusat et al.
2009/0010162 A1 1/2009 Bergamasco et al.
2009/0073882 A1* 3/2009 McAlpine et al. ............ 370/235
2009/0232138 A1 9/2009 Gobara et al.
2009/0252038 A1 10/2009 Cafiero et al.
2011/0007741 A1 1/2011 Kreeger et al.

FOREIGN PATENT DOCUMENTS

EP 1206099 5/2002
WO WO2004/064324 7/2004
WO WO 2006/047092 5/2006
WO WO 2006/047109 5/2006
WO WO 2006/047194 5/2006
WO WO 2006/047223 5/2006
WO 2006/063922 6/2006
WO WO 2006/057730 6/2006
WO WO 2007/050250 5/2007
WO 2008/097730 1/2008

OTHER PUBLICATIONS

PCT Written Opinion of the International Searching Authority mailed Sep. 27, 2007, from International Application No. PCT/US06/38858 (6 pp.).
Cisco Systems, Inc., "Cisco data Center Network Architecture and Solutions Overview," http://www.cisco.com/application/pdf/en/us/guest/netsol/ns377/c643/cdccont_0900aecd802c9a4f.pdf, 2006.
F. Kamoun, et al., "Analysis of Shared Finite Storage in a Computer Network Node Environment Under General Traffic Conditions", IEEE Transactions on Communications, Jul. 1990.
A.K. Choudry, et al., "Dynamic Queue Length Thresholds for Shared-Memory Packet Switches", IEEE/ACM Transactions on Networking, Apr. 1998.
A.K. Choudry, et al., "A New Buffer Management Scheme for Hierarchical Shared Memory Switches", IEEE/ACM Transactions on Networking, 26 pp., 1997.
J. Mahdavi, et al., "IPPM Metrics for Measuring Connectivity", RFC 2678, pp. 1-9, Sep. 1999.
J. Postel, "Internet Control Message Protocol, DARPA Internet Program Protocol Specification", RFC 792, pp. 1-15, Sep. 1981.
Wei Cao Huawei Technologies: "IEEE 802.1ah Mode for Ethernet Over MPLS; draft-cao-pwe3-801-1ah-00.txt" IEFT Standard-Working-Draft, Internet Engineering Task Force, IEFT, Ch, Oct. 16, 2006, XP015047518 ISSN: 000-0004.
International Search Report and Written Opinion, dated May 23, 2008, from PCT/US08/051986.
International Search Report and Written Opinion, dated Oct. 15, 2008, from PCT/US08/069154.
CN Office Action mailed Jul. 31, 2009, in Chinese Application No. 200580034647.5.
CN Second Office Action mailed Feb. 5, 2010, in Chinese Application No. 200580034647.5.
CN Second Office Action mailed Feb. 27, 2009, in Chinese Application No. 200580035946.
CN Second Office Action mailed Jan. 15, 2010, in Chinese Application No. 200580034646.0.
CN Office Action mailed Feb. 12, 2010, in Chinese Application No. 200580034955.8.
CN Office Action mailed Apr. 3, 2009, in Chinese Application No. 200680032204.
EPO Extended Search Report mailed Jul. 16, 2009, in EP Application No. 05810244.3.
EPO Office Action mailed Oct. 1, 2009, in EP Application No. 05810244.3.
EPO Extended Search Report mailed Jul. 13, 2009, in EP Application No. 05810800.2.
EPO Office Action mailed Oct. 19, 2009, in EP Application No. 05810800.2.
EPO Search Report mailed Mar. 19, 2010, in EP Application No. 08728248.9.
EPO Office Action mailed Jun. 18, 2010, in EP Application No. 08728248.9.
US Office Action mailed Apr. 22, 2009 in related U.S. Appl. No. 11/084,587.
US Office Action mailed Nov. 23, 2009 in related U.S. Appl. No. 11/084,587.
US Office Action mailed Jun. 24, 2010 in related U.S. Appl. No. 11/084,587.
US Notice of Allowance mailed Mar. 23, 2009 in related U.S. Appl. No. 11/078,992.
US Final Office Action mailed Mar. 17, 2009 in related U.S. Appl. No. 11/400,671.
US Office Action mailed Jun. 22, 2009 in related U.S. Appl. No. 11/400,671.
US Office Action mailed Dec. 9, 2009 in related U.S. Appl. No. 11/400,671.
US Final Office Action mailed Jun. 11, 2010 in related U.S. Appl. No. 11/400,671.
US Office Action mailed Apr. 7, 2009 in related U.S. Appl. No. 11/094,877.
US Office Action mailed Nov. 4, 2009 in related U.S. Appl. No. 11/094,877.
US Notice of Allowance mailed Apr. 23, 2010 in related U.S. Appl. No. 11/094,877.
US Notice of Allowance mailed Jun. 28, 2010 in related U.S. Appl. No. 11/094,877.
US Office Action mailed Mar. 4, 2009 in related U.S. Appl. No. 11/152,991.
US Final Office Action mailed Aug. 18, 2009 in related U.S. Appl. No. 11/152,991.
US Notice of Allowance mailed Dec. 31, 2009 in related U.S. Appl. No. 11/152,991.
US Notice of Allowance mailed May 17, 2010 in related U.S. Appl. No. 11/152,991.
US Notice of Allowance mailed May 29, 2009 in related U.S. Appl. No. 11/155,388.
US Notice of Allowance mailed Jul. 17, 2009 in related U.S. Appl. No. 11/155,388.
US Office Action mailed May 14, 2009 in related U.S. Appl. No. 11/248,933.
US Final Office Action mailed Dec. 28, 2009 in related U.S. Appl. No. 11/248,933.
US Office Action mailed May 13, 2010 in related U.S. Appl. No. 11/248,933.
US Office Action mailed Apr. 15, 2009 in related U.S. Appl. No. 11/670,544.
US Final Office Action mailed Oct. 22, 2009 in related U.S. Appl. No. 11/670,544.
US Office Action mailed Oct. 19, 2009 in related U.S. Appl. No. 11/825,631.
US Office Action mailed Apr. 28, 2010 in related U.S. Appl. No. 11/825,631.
IEEE Standards 802.3™—2002, IEEE Computer Society, Mar. 8, 2002, 1538 pages.
MAC Control PAUSE Operation, 31B.3.1 Transmit Operation, Annex 31B, IEEE Std 802.3ae-2002, 4 pages.
IEEE Standards 802.3ah™—2004, IEEE Computer Society, Sep. 7, 2004, 623 pages.
MAC Control PAUSE Operation, 31B.1 PAUSE description, Annex 31B, IEEE Std 802.3, 1998 Edition, 11 pages.
IEEE Standards 802.3ak™—2004, IEEE Computer Society, Mar. 1, 2004, 52 pages.
31. MAC Control, IEEE Std 802.3-2002, Section Two, 9 pages.
Mekkittikul et al., A Practical Scheduling Algorithm to Achieve 100% Throughput in Input-Queued Switches, Computer Systems Laboratory, Stanford University, 1998, 8 pages.
J. Moy, OSPF Version 2 (RFC 2178), Network Working Group, Cascade Communications Corp., Jul. 1997, 211 pp.
Floyd et al., Random Early Detection Gateways For Congestion Avoidance, Lawrence Berkeley Laboratory, Univ. of California, IEEE/ACM Transactions on Networking, Aug. 1993, 22 pages.
K. Ramakrishnan et al., "The Addition of Explicit Congestion Notification (ECN) to *IP*," RFC 3168, Sep. 2001.
U.S. Appl. No. 10/777,886, entitled "End-to-End Congestion Control", filed On Dec. 18, 2001.
U.S. Appl. No. 60/621,396, filed Oct. 22, 2004.
InfiniBand Arch, Spec, vol. 1, Oct. 24, 2000.
InfiniBand Arch, Spec, vol. 2, Oct. 24, 2000.
International Search Report, dated Sep. 21, 2006 from corresponding International Application No. PCT/US05/37069, 4 pp.
Written Opinion of the International Searching Authority, dated Sep. 21, 2006 from corresponding International Application No. PCT/US05/37069, 7 pp.
International Search Report, mailed Nov. 1, 2006 from related International Application No. PCT/US05/36700, 3 pp. including Notification of Transmittal.
Written Opinion of the International Searching Authority, mailed Nov. 1, 2006 from related International Application No. PCT/US05/36700, 5 pp.
International Search Report, mailed Oct. 18, 2006, from related International Application PCT/US05/37765, 3 pp. including Notification of Transmittal.
Written Opinion of the International Searching Authority, mailed Oct. 18, 2006, from related International Application PCT/US05/37765, 7 pp.

International Search Report, mailed Jan. 16, 2007, from related International Application No. PCT/US05/37239from International Application No. PCT/US05/37239.
Written Opinion of the International Searching Authority, mailed Jan. 16, 2007, from International Application No. PCT/US05/37239.
International Search Report, mailed Feb. 20, 2007, from related International Application No. PCT/US05/37651, from International Application No. PCT/US05/37651.
Written Opinion of the International Searching Authority, mailed Feb. 20, 2007, from International Application No. PCT/US05/37651.
International Search Report mailed Jun. 4, 2008 in International Application No. PCT/US2007/066027.
Written Opinion mailed on Jun. 4, 2008 in International Application No. PCT/US2007/066027.
CIPO Office Action mailed Aug. 8, 2008 in Chinese Application No. 200580035946.
CIPO Office Action mailed Jul. 18, 2008 in Chinese Application No. 200580034646.0.
Office Action mailed Mar. 31, 2008 for U.S. Appl. No. 11/084,587.
Sancho et al.; "Analyzing the Influence of Virtual Lanes on the Performance on Infiniband Networks"; 2002; IEEE Proceeding of the International Parallel and Distributed processing Symposium (IPDPS'02); pp. 1-10.
Office Action mailed Jan. 30, 2008 for U.S. Appl. No. 11/078,992.
Final Office Action mailed Jul. 11, 2008 for U.S. Appl. No. 11/078,992.
Office Action mailed Jul. 3, 2008 for U.S. Appl. No. 11/400,671.
Office Action mailed Feb. 21, 2008 for U.S. Appl. No. 11/094,877.
Office Action mailed Jul. 28, 2008 for U.S. Appl. No. 11/094,877.
Office Action mailed Jan. 24, 2008 for U.S. Appl. No. 11/152,991.
Final Office Action mailed Sep. 8, 2008 for U.S. Appl. No. 11/152,991.
Office Action mailed May 29, 2008 for U.S. Appl. No. 11/155,388.
Final Office Action mailed Sep. 15, 2008 for U.S. Appl. No. 11/155,388.
Office Action mailed Oct. 23, 2008 for U.S. Appl. No. 11/078,992.
Office Action mailed Oct. 28, 2008 for U.S. Appl. No. 11/084,587.
Final Office Action mailed Dec. 10, 2008 for U.S. Appl. No. 11/094,877.
CN Third Office Action mailed Aug. 11, 2010, in Chinese Application No. 200580034647.5.
CN Fourth Office Action mailed Jan. 10, 2011, in Chinese Application No. 200580034647.5.
CN Second Office Action mailed Aug. 11, 2010, in Chinese Application No. 200580034955.8.
CN Third Office Action mailed Dec. 3, 2010, in Chinese Application No. 200580034955.8.
US Final Office Action mailed Nov. 26, 2010 in related U.S. Appl. No. 11/084,587.
US Notice of Allowance mailed Oct. 8, 2010 in related U.S. Appl. No. 11/248,933.
US Notice of Allowance mailed Feb. 4, 2011, in related U.S. Appl. No. 11/248,933.
US Office Action mailed Oct. 29, 2010 in related U.S. Appl. No. 11/825,631.
CN Third Office Action mailed Jul. 6, 2011, in Chinese Application No. 200580034646.0.
EPO Extended Search Report mailed Jun. 1, 2011 in EP Application No. 05812799.4.
EPO Office Action mailed Apr. 12, 2011, in EP Application No. 05810244.3.
US Notice of Allowance mailed Feb. 22, 2011, in related U.S. Appl. No. 11/084,587.
U.S. Appl. No. 13/112,824, entitled "Ethernet Extension For The Data Center", filed May 20, 2011.
US Office Action mailed Jan. 30, 2008 in related U.S. Appl. No. 11/078,992.
US Office Action mailed Apr. 13, 2011 in related U.S. Appl. No. 12/485,337.
US Notice of Allowance mailed Aug. 26, 2011 in related U.S. Appl. No. 12/485,337.
U.S. Appl. No. 13/101,870, entitled "Methods and Devices for Backward Congestion Notification", filed May 5, 2011.
US Office Action mailed May 26, 2011 in related U.S. Appl. No. 11/825,631.

* cited by examiner

260

0 15 31

EtherType - CM-Tag | L | FlowID 265 270 275

P | Flow Hash 280 285

*Fig. 2D*

BACKWARD CONGESTION NOTIFICATION

BACKGROUND OF THE INVENTION

As the speed of network traffic increases, controlling network congestion in an acceptable manner becomes increasingly challenging. This is true in part because it is not economically feasible to increase buffer sizes in proportion to the higher network speeds. High speed, coupled with proportionally smaller buffer sizes and low latency, causes buffers to fill up very quickly when congestion arises.

Some examples of high-speed, low latency networks having relatively small buffers, which will be referred to herein as Data Center Ethernet ("DCE") or the like, are described below. Many of the congestion management challenges of DCE networks are shared by other networks, including but not limited to Fibre Channel networks and high-speed Ethernet. It would be very desirable to implement methods and devices that address at least some of the shortcomings of the prior art.

BRIEF DESCRIPTION OF THE DRAWINGS

FIGS. 2C and 2D depict an example format of a "short form" congestion management ("CM") tag.

DESCRIPTION OF EXAMPLE EMBODIMENTS

Overview

Figure 1:
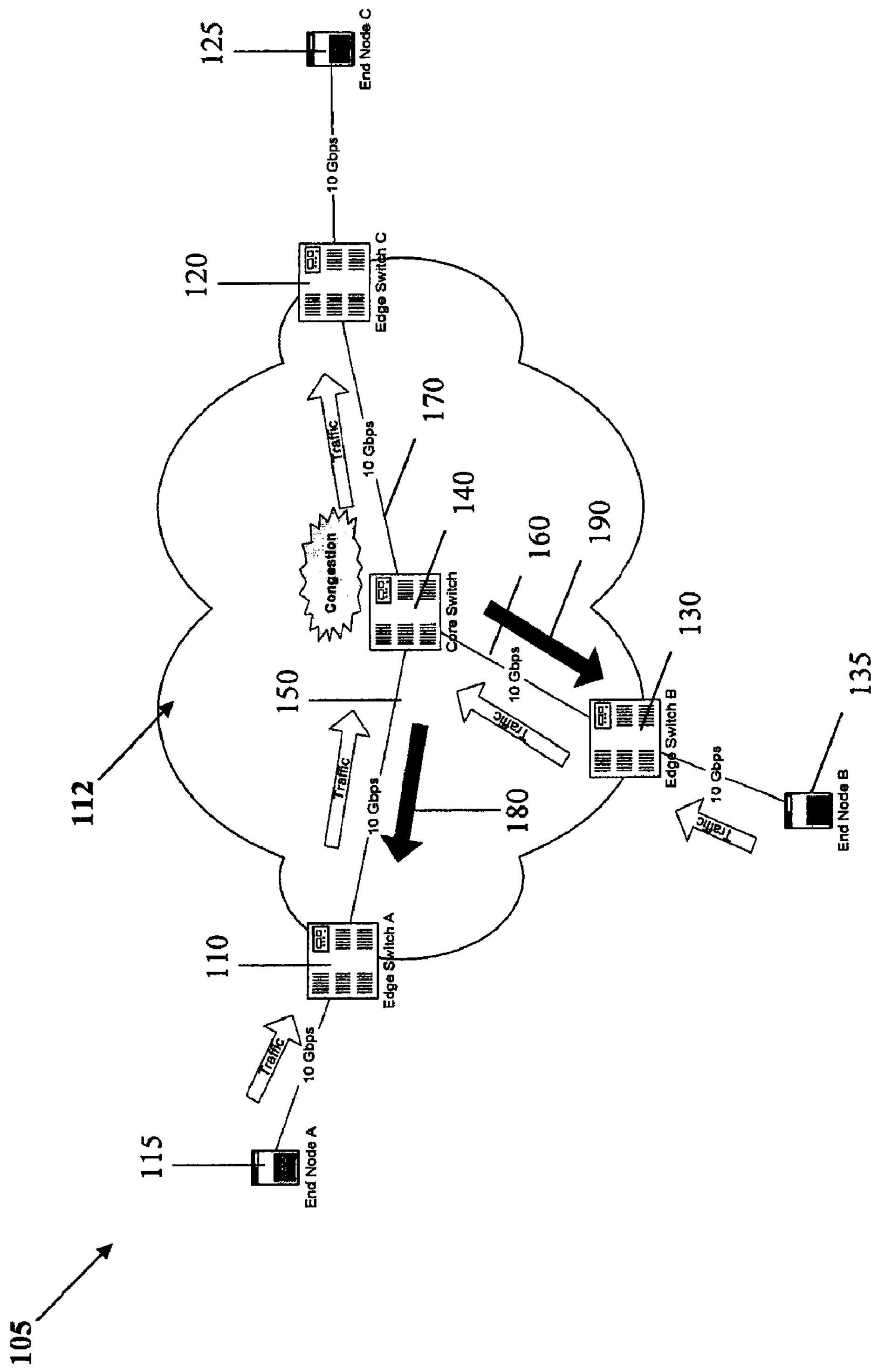
FIG. 1 is a network diagram illustrating a congestion point that is sending backwards congestion notification ("BCN") messages due to network congestion.

In one embodiment, an apparatus comprises a network interface system having at least one input port configured for receiving frames and a logic system comprising at least one logic device. The logic system may be configured to perform the following functions: determining a source address and a destination address of a frame received at an ingress port; calculating a flow hash based at least upon the source address and the destination address; forming a congestion management ("CM") tag that includes the flow hash; inserting the CM tag in the frame; and forwarding the frame to the destination address.

Example Embodiments

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order not to obscure the present invention.

Reference will now be made in detail to some specific examples of the invention, including the best modes contemplated by the inventor for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well-known process operations have not been described in detail in order not to obscure unnecessarily the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted.

Similarly, the steps of the methods shown and described herein are not necessarily all performed (and in some implementations are not performed) in the order indicated. Moreover, some implementations of the methods discussed herein may include more or fewer steps than those shown or described.

Furthermore, the techniques and mechanisms of the present invention will sometimes describe and/or illustrate a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, an indicated connection does not necessarily mean a direct, unimpeded connection unless otherwise noted. Moreover, there may be other connections between entities than are indicated herein, e.g., in network diagrams.

Various implementations of the present invention provide improved methods and devices for managing network traffic. Some implementations of the invention allow congestion to be pushed from congestion points in the core of a network to reaction points, which may be edge devices, host devices or components thereof. Rate limiters may shape individual flows of the reaction points that are causing congestion. Parameters of these rate limiters may be tuned according to feedback from congestion points, e.g., in the form of BCN messages. In some implementations, such BCN messages include congestion change information and at least one instantaneous measure of congestion. The instantaneous measure(s) of congestion may be relative to a threshold of a particular queue and/or relative to a threshold of a buffer that includes a plurality of queues. The BCN frames described herein are examples of such BCN messages.

Some embodiments of the present invention provide congestion management methods that may be implemented by network devices, such as switches and routers, as well as host devices such as desktop computers, laptops, etc. Some implementations of the present invention are particularly suitable for implementing a DCE solution, which simplifies the connectivity of data centers and provides a high bandwidth, low latency network for carrying Ethernet and storage traffic.

Some examples of DCE methods and devices are described in United States Patent Application Publication No. 2006/0251067, entitled "FIBRE CHANNEL OVER ETHERNET", in United States Patent Application Publication No. 2006/0171318, entitled "ACTIVE QUEUE MANAGEMENT METHODS AND DEVICES" and in United States Patent Application Publication No. 2007/0081454, entitled "METHODS AND DEVICES FOR BACKWARD CONGESTION NOTIFICATION,", collectively the DCE Applications, which are hereby incorporated by reference. However, the present invention has wide applicability outside of the DCE context and is suitable for Fibre Channel networks, IP networks and potentially any kind of packet switched network. Moreover, some congestion managed domains described herein include DCE portions as well as other portions, e.g., classical Ethernet portions.

FIG. 1 shows a DCE network 105 that includes core switch 140, edge switches 110, 120 and 130 and corresponding end nodes 115, 125 and 135. Core switch 140, edge switches 110, 120 and 130 and end nodes 115, 125 and 135 comprise network interface systems (e.g., ports, line cards, etc.), logic systems (e.g., logic devices such as programmable logic devices, processors, etc.), memory, etc., suitable for performing the tasks described herein. DCE 105 is a simple example of a congestion managed domain. End nodes 115 and 135 are simultaneously sending traffic at a line rate (10 Gbps, in this example) to end node 125. Because the aggregate traffic rate from links 150 and 160 exceeds the capacity of link 170 in this example, link 170 is subject to congestion and the queue(s) associated with it start filling up. Those of skill in the art will appreciate that links 150, 160 and 170 are merely illustrative and that in some networks there may be more links, core devices, etc., disposed between the edge switches and the core switch shown in FIG. 1.

In this example, core switch 140 comprises a "congestion point" that detects the congestion condition. According to preferred implementations of the invention, as soon as a congestion point detects congestion, it starts sending explicit feedback messages to the reaction points associated with the traffic flows causing such congestion. Such feedback messages will sometimes be referenced herein as backwards congestion notification ("BCN") messages, BCN frames, or the like. In some such implementations, the feedback message is an Ethernet frame, which may have a format similar to that of one of the frame depicted herein.

In this example, core switch 140 causes "slow-down" BCN messages 180 and 190 to be sent towards end nodes 115 and 135. These messages will also be referred to herein as a "negative BCN feedback messages" or the like. Such messages (and other BCN messages that are described below) are processed at "reaction points," where congestion mitigation measures are put into place. The reaction points could be edge switches 110 and 130, or, in some implementations, end nodes 115 and 135.

For devices configured to operate as reaction points, the processing of a negative BCN feedback message will result in the instantiation of a filter/rate limiter (or a further slow down of the one(s) already instantiated, if any) at the reaction point. The purpose of the rate limiter is to slow down a congesting traffic flow to mitigate congestion at the core switch. If congestion should improve (or dissipate completely), "speed-up" messages (also referred to herein as "positive BCN feedback messages" or the like) will cause the rate limiters to increase their rate to avoid wasting bandwidth at the congestion point.

Figure 2A:
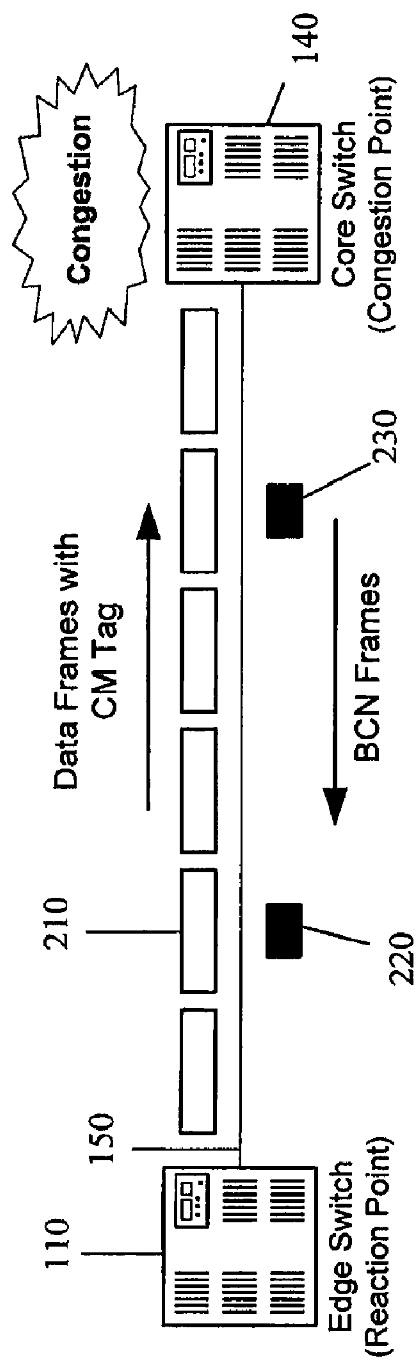
FIGS. 2A and 2B illustrate a flow of congestion management ("CM") tags and BCN frames between a congestion point and a reaction point.
Figure 2B:
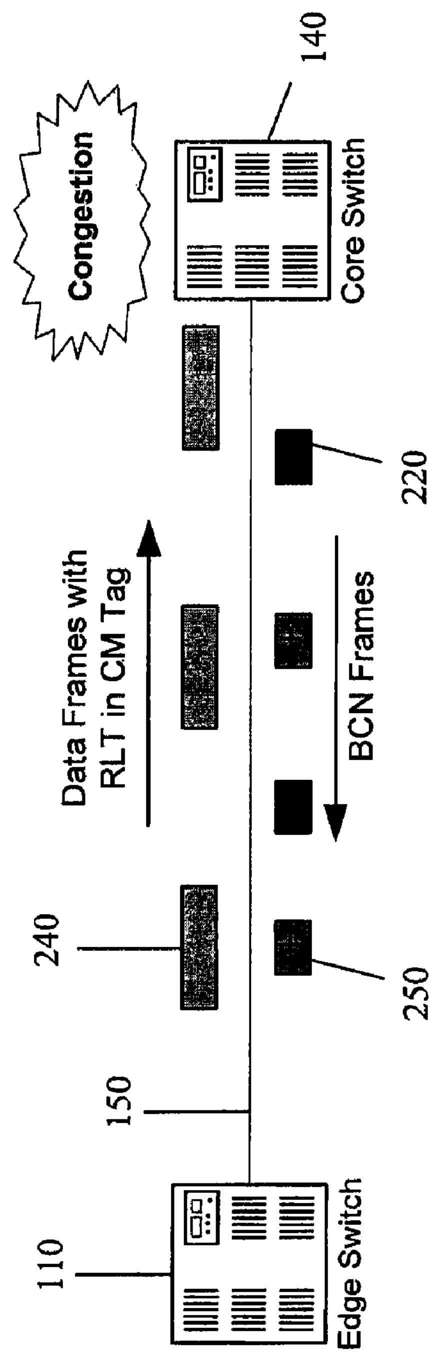

FIGS. 2A and 2B illustrate examples of message exchanges between a congestion point and a reaction point in a congestion managed domain. Here, the congestion point is core switch 140 and the reaction point is edge switch 110. In this example, all frames entering BCN-enabled network 112 are tagged by an edge switch (in this example, edge switch 110) with a congestion management tag ("CM tag"). Various permutations of CM tags are within the scope of the present invention, some examples of which are described herein.

In this example, edge switch 110 has received no recent indication of congestion for the flow with which frame 210 is associated. Therefore, edge switch 110 inserts a "short form" CM tag of the general type shown in FIGS. 2C and 2D. CM tag 260 begins with a special code in Ethertype field 265 that identifies CM tag 260 as a CM tag. Here, CM tag 260 includes Look Further Bit ("L bit") 270, followed by Flow Identifier ("FlowID") 275, the latter of which is a 15-bit field in this example. L bit 270 indicates whether any further information will follow FlowID 275. Here, if L bit 270 is set, this condition indicates that information will follow FlowID 275, e.g., as described in some examples below. Because edge switch 110 has received no recent indication of congestion for the flow with which frame 210 is associated, edge switch 110 does not set L bit 270.

Figures 2C, 2D:
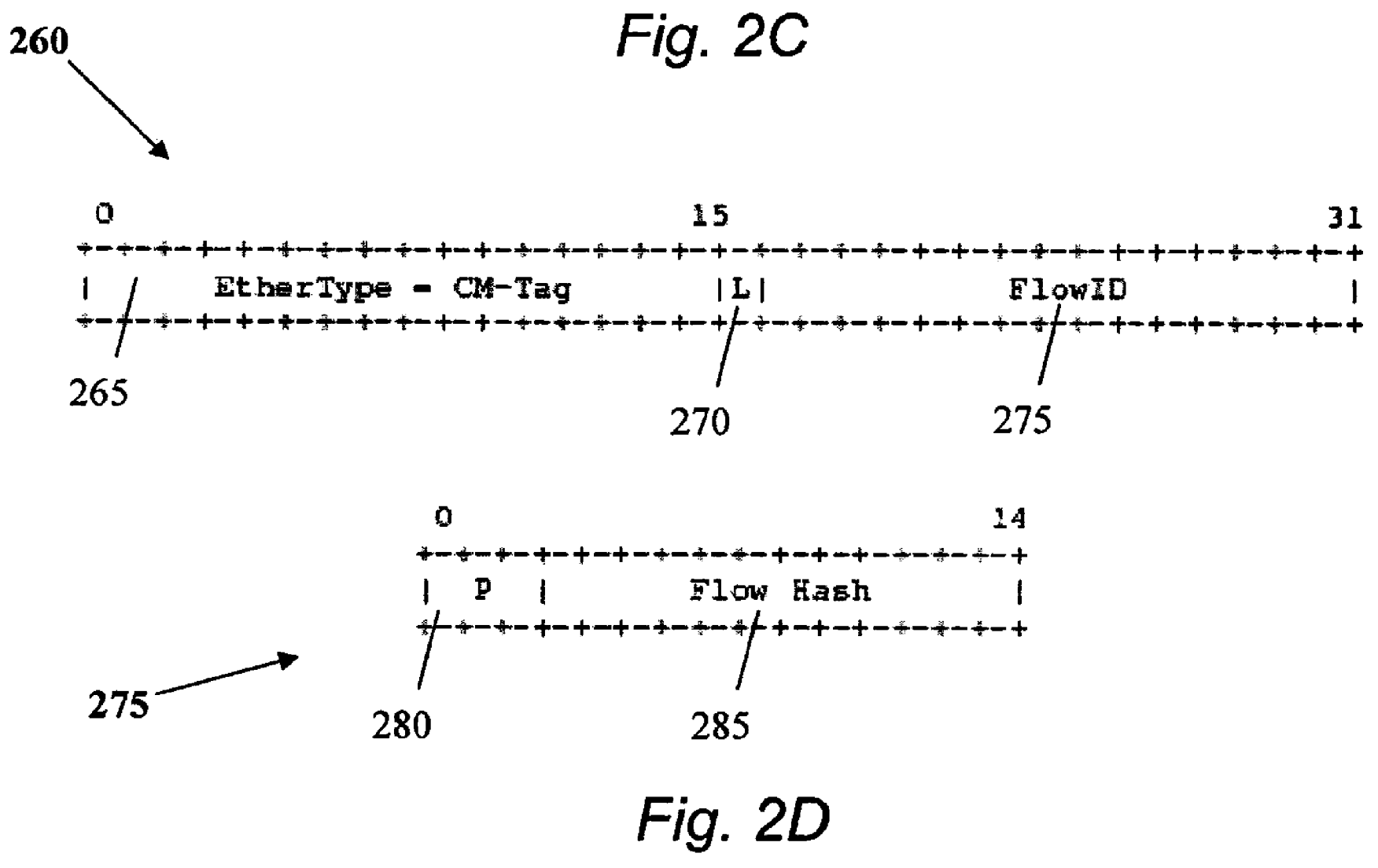

An example of how FlowID 275 may be structured is provided in FIG. 2D. Here, "P" field 280 indicates the priority of the frame within which CM tag 260 will be inserted. In this example, the value of Flow Hash 285 is the result of a hash function calculated according to values of the destination address, source address and virtual local area network ({DA, SA, VLAN}) fields of the incoming frame. For Fibre Channel over Ethernet ("FcoE") traffic, Flow Hash 285 may be calculated on the destination ID and source ID ({D_ID, S_ID}) fields of the Fibre Channel frame carried inside the Ethernet frame, in order to achieve a finer granularity of rate control. In general, Flow Hash 285 is preferably calculated on the finest granularity of flow detectable and queueable by a BCN reaction point.

In some implementations, if a congestion point receives a frame with no CM tag it will raise an exception flag and drop the frame. In this implementation, a predetermined value of FlowID 275 (e.g., a value of zero) denotes traffic flows that should not be rate-limited (e.g., network control traffic). In some implementations, unless FlowID 275 is set to such a predetermined value, FlowID 275 is relevant only within the entity that inserts the CM tag.

Returning again to FIG. 2A, in this example core switch 140 has detected congestion. Core switch 140 has sent negative BCN feedback message 220 to a reaction point (edge switch 110), indicating that edge switch 110 should slow down its rate of transmission. Preferably, negative BCN feedback message 220 includes sufficient detail to allow edge switch 110 to identify a particular traffic flow (i.e., a layer 2 flow, a layer 3 flow, or a layer 4 flow) that needs to be slowed. A BCN frame may include information regarding the severity of congestion and/or the extent to which a reaction point should slow down or speed up a particular traffic flow. In this example, core switch 140 has subsequently sent a "stop" BCN message 230 to edge switch 110. As described in more detail below, a "stop" BCN message 230 will cause a reaction point to stop transmitting data (preferably on a specified data flow) for a period of time. A BCN frame may be generated by a congestion point by sampling incoming traffic, e.g., as described below.

FIG. 2B illustrates examples of exchanges of messages that may occur when a reaction point has already received one or more BCN frames from a congestion point. Here, edge switch 110 has previously received BCN frames from core switch 140. Additional BCN frames are en route, including positive BCN feedback message 250 and another negative BCN feedback message 220.

In this example, when edge switch 110 receives a BCN frame from congestion point 140 and the BCN frame indicates that a reaction point should undertake a congestion mitigation action on a particular data flow (e.g., the installation of a rate limiter or the slowing down of an existing one), edge switch 110 stores congestion point identification data in a local register associated with such data flow. Edge switch 110 will subject frames belonging to that flow to the indicated congestion mitigation action. Moreover, edge switch 110 will insert a CM tag with a Rate Limited Tag ("RLT") option into frames belonging to that flow. The RLT option will contain congestion point identification data that are subsequently injected by edge switch 110 into the congestion managed domain.

Figure 3:
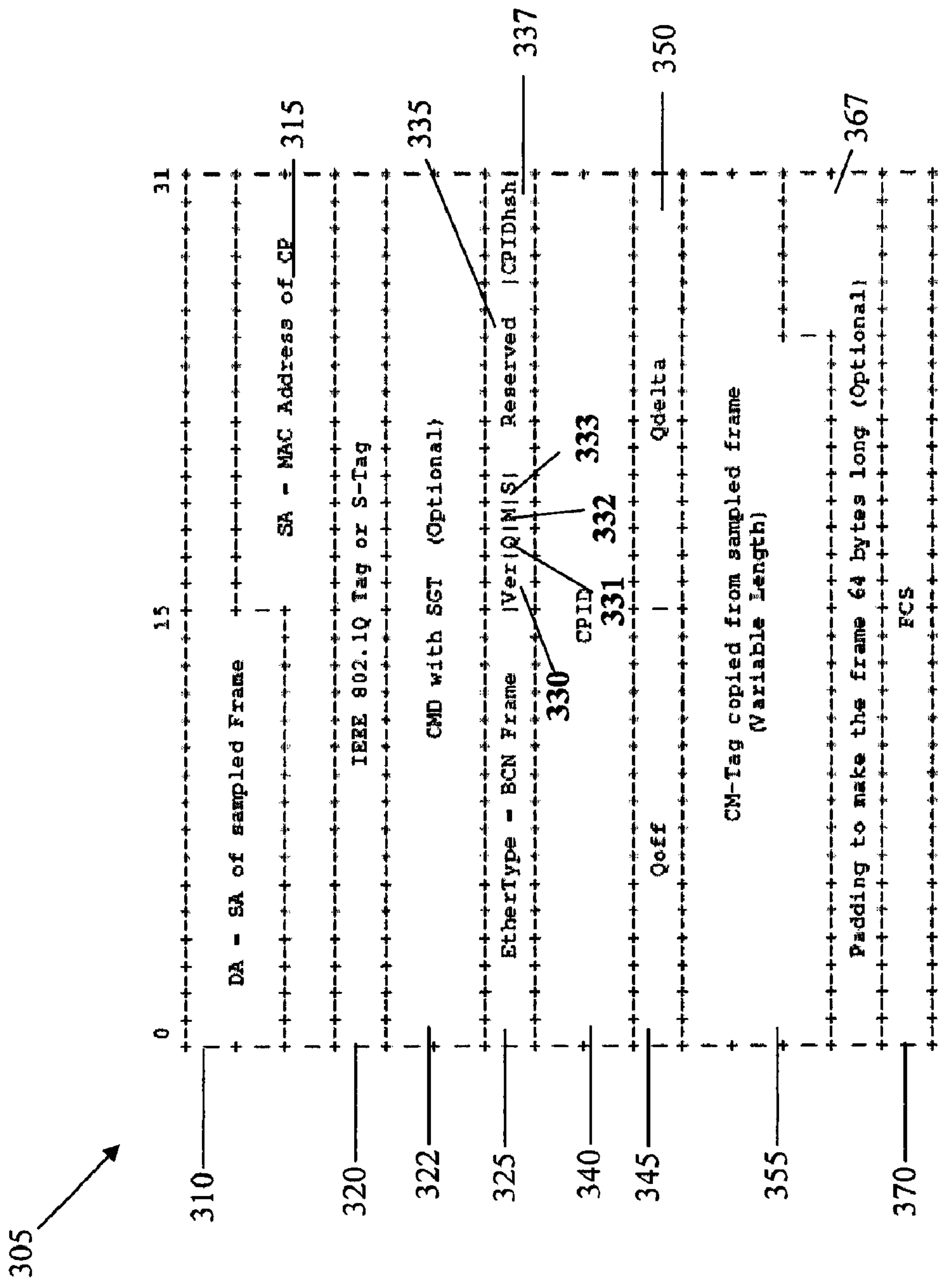
FIG. 3 illustrates an example of a BCN frame format.

One example of a BCN frame is depicted in FIG. 3. BCN frame 305 includes Destination Address ("DA") 310, which may be equal to the Source Address of the sampled frame. Some exceptions are described below. This allows BCN Frame 220 to be routed back to the source of the traffic causing congestion (in this example, to edge switch 110) with a valid source address. BCN frame 305 also has a Source Address ("SA") 315 equal to an address (here, a MAC address) associated with the congestion point.

In this example, field 320 is an IEEE 802.1Q tag that carries the VLAN of the sampled frame and the Priority field indicating the highest priority. Here, field 320 will indicate a null VLAN in two instances: (1) if the sampled frame did not carry an 802.1Q tag or (2) if the VLAN field of such tag indicated a null value.

A Cisco MetaData header ("CMD") carrying a Security Group Tag ("SGT") option may optionally follow the IEEE802.1Q Tag or S-Tag. (Field 322.) If so, the SGT may contain a value specifically assigned to the congestion point originating BCN frame 305. An SGT value may be drawn from a configuration register in the congestion point's register block.

Field 325 identifies the frame as being a BCN feedback message, in this example by indicating a predetermined EtherType. These EtherTypes are assignable by the IEEE Standards Department, 445 Hoes Lane, P.O. Box 1331, Piscataway, N.J. 08855-1331.

Version field 330 indicates the version of the BCN protocol. In this example, three bits following version field 330 change the semantics of the BCN message when they are set. The meaning of these bits will be described in more detail below. Q bit 331 indicates that Qdelta is saturated. In the example described below, Qdelta is saturated when its value is either equal to −2Qeq or +2Qeq. M bit 332 indicates a condition of mild congestion, whereas S bit 333 indicates a condition of severe congestion. Reserved bits in field 335 are not used in this example. Instead, they are set to zero on transmission and ignored on reception. Alternative implementations may include other metrics for congestion indication in a BCN frame. Moreover, future versions of the BCN protocol may redefine all or some of the reserved bits.

CPIDhsh field 337 indicates a hash of at least some data in the congestion point identifier ("CPID") field 340. Any convenient hash function may be used to generate the value in CPIDhsh field 340. CPIDhsh field 340 may be used to minimize the amount of false positive feedback generated by multiple congestion points along the path from a source congestion point to a destination reaction point.

Field 340 indicates a CPID. A primary purpose of the CPID is to identify the congested entity in the network which has generated a BCN frame. Therefore, the CPID should ideally be unique across the network. The CPID preferably includes at least a MAC address associated with the network device that includes the congestion point, to ensure global uniqueness, plus a local identifier to ensure local uniqueness. In this example, the congested entity is a queue of core switch 140. This information is sent to a reaction point (here, to edge switch 110) in order to create an association between the congested entity and the reaction point.

Qoff field 345 and Qdelta field 350 contain quantitative feedback information conveyed by the congestion point to the reaction point. The use of such fields will be described below. In alternative implementations, other types of quantitative feedback information may be included in a BCN frame.

Payload 355 contains a CM tag—including its Ethertype—copied from the sampled frame. A primary purpose of payload 355 is to convey to the reaction point enough flow identification information to exert focused congestion mitigation actions. In some implementations, payload 355 will identify a traffic flow according to the 4-tuple {DA, SA, VLAN, Priority}.

Payload 355 may be required to have a minimum length, such that the resulting BCN frame 305 is always as large as, or larger than, a minimum-sized frame of the type used to implement the invention (e.g., a minimum-sized Ethernet frame of 64 bytes). If necessary, padding 367 will be added in order to ensure the length of BCN frame 305 is 64 bytes or larger. Field 370 is the Frame Check Sequence or CRC of the BCN frame 305.

Figure 4A:
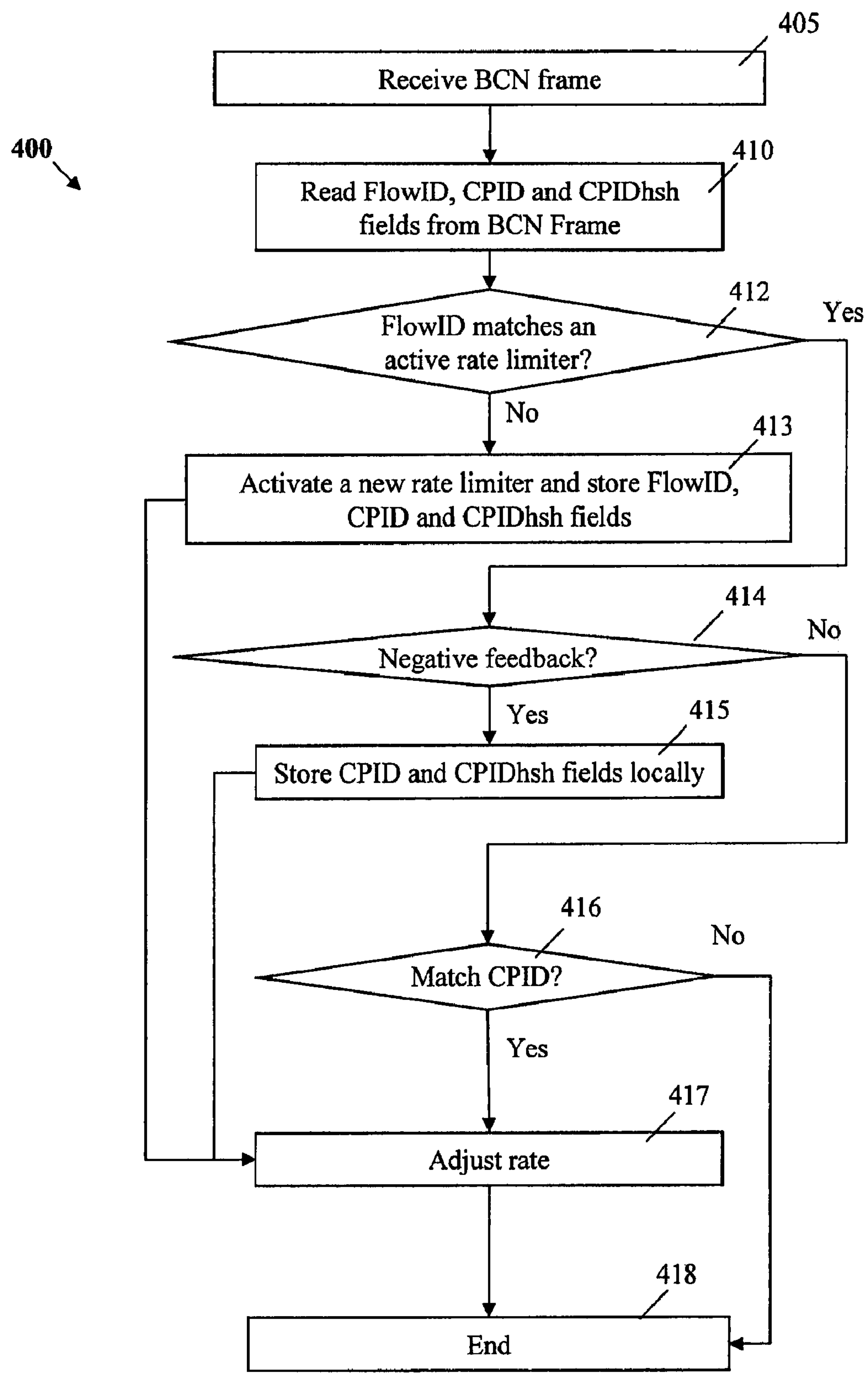
FIG. 4A is a flow chart that outlines a process that may be performed by a reaction point that is receiving BCN frames.

Flow chart 400 of FIG. 4A outlines an example of steps that may be performed by a reaction point that receives a BCN frame from a congestion point indicating a congestion mitigation action to be performed on a particular traffic flow (e.g., the activation of a rate limiter or the adjustment of an existing one). In step 405, a BCN frame is received by a reaction point. The reaction point reads the FlowID, CPID and the CPIDhsh fields from the BCN frame (step 410). The FlowID field is then compared with the ones currently stored with all active rate limiters (step 412). If there is no match, a new rate limiter is activated and the FlowID, CPID, and CPIDhsh fields are stored with the new rate limiter (Step 413) and the rate is subsequently adjusted (step 417).

If a rate limiter matching the FlowID from the BCN frame already exists, then the reaction point determines the feedback indicated by the BCN frame. If the feedback is negative, the reaction point stores the CPID and CPIDhsh field values (step 415) and adjusts the rate for the corresponding flow (step 417). Otherwise, the reaction point compares the CPID from the BCN frame with the one currently stored (step 416). If there is a match, the rate is adjusted (step 417). Otherwise, the BCN frame is ignored and the process terminates. (Step 418.)

Figure 4B:
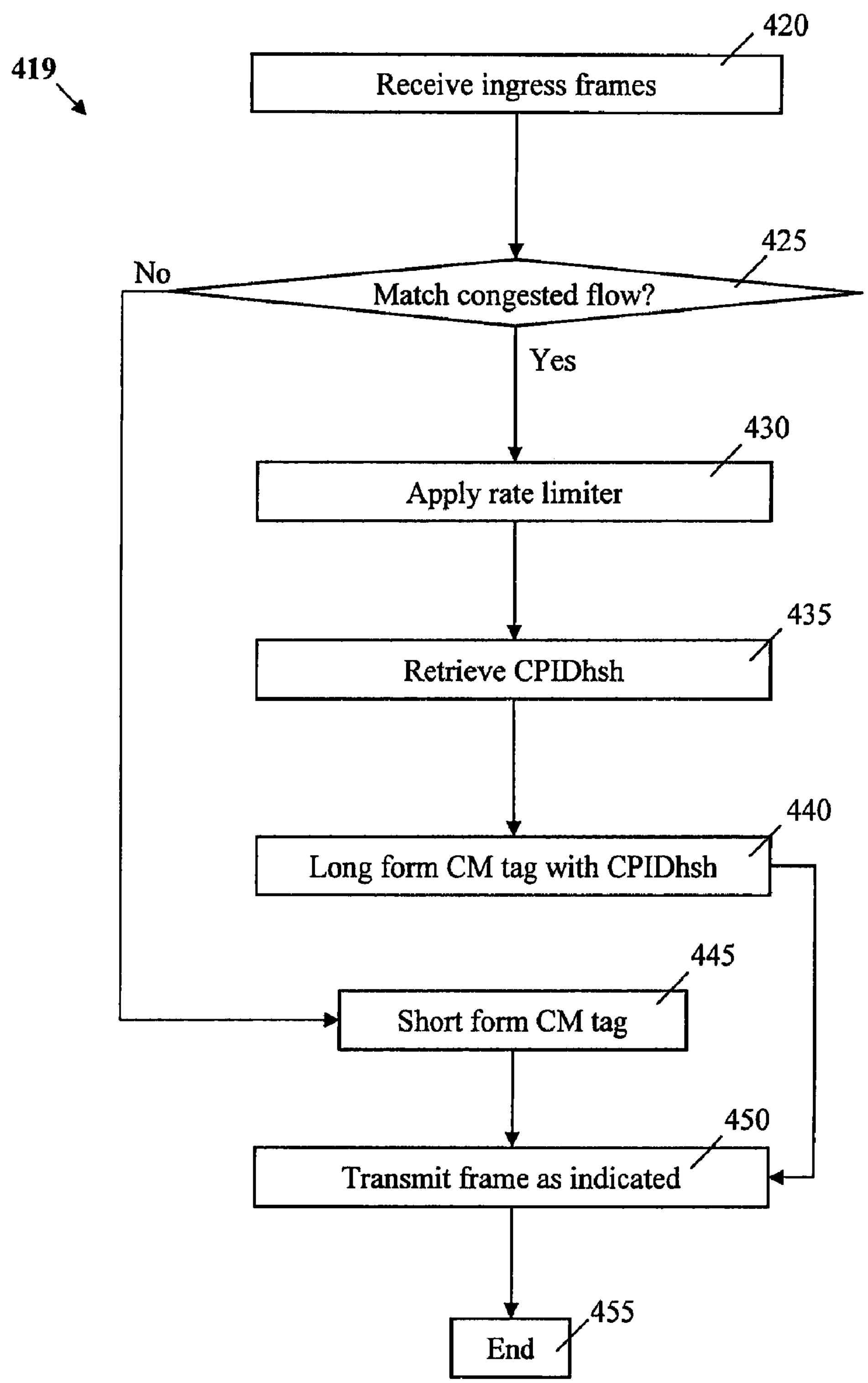
FIG. 4B is a flow chart that outlines a process that may be performed by a reaction point that is receiving ingress frames.

FIG. 4B is a flow chart that outlines a process 419 that a reaction point may perform when receiving ingress frames. When a reaction point receives ingress frames, (step 420), the reaction point determines whether the corresponding flow matches with a flow known to be congested, e.g., for which a BCN frame has recently been received. (Step 425.) If there is such a match, the reaction point will apply the corresponding rate limiter. (Step 430.) Moreover, the reaction point will copy the CPIDhsh for the flow from the appropriate register (step 435) and form a "long form" CM tag containing the CPIDhsh from the register. (Step 440.) The long form CM tag may be according to the Rate Limited Tag ("RLT") Option described below.

If no match is found in step 425, the reaction point will create and insert a "short form" CM tag into the frame. (Step 445.) The reaction point will subsequently inject the frame into the BCN-enabled network. (Step 450.)

Figure 5:
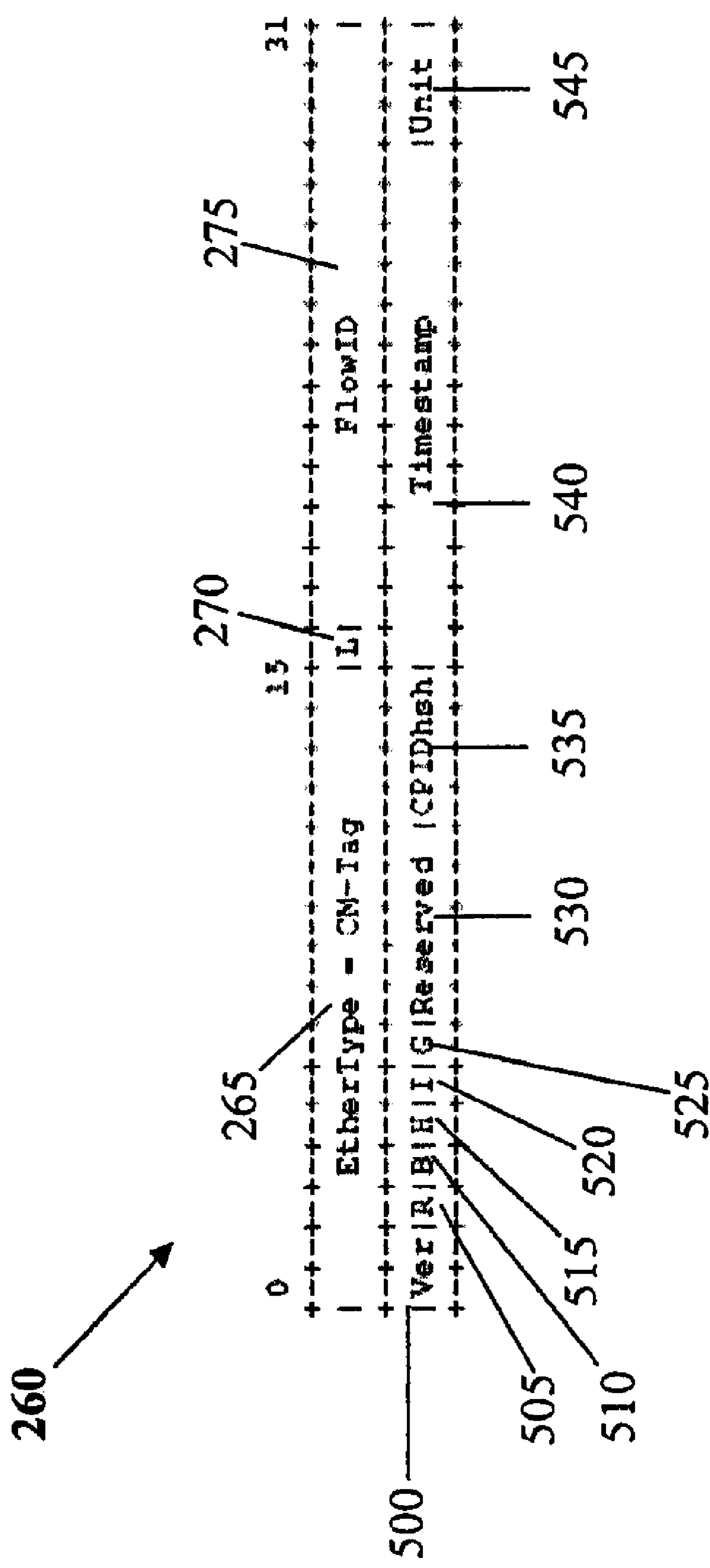
FIG. 5 is an example format for a CM tag that includes a Rate Limited Tag ("RLT") option.

FIG. 5 illustrates an example of a long form CM tag according to the RLT option. In this example, L bit 270 of CM tag 260 has been set to "1," indicating that additional information follows FlowID field 275. Version field 500 indicates the version of the BCN protocol. If a BCN implementation version X receives a BCN frame with version Y and Y>X, the BCN implementation should use only the fields defined for version X.

Here, RLT bit ("R bit") 505 is set to 1, indicating that this CM tag includes the RLT option. The uses of B bit 510, H bit 515, I bit 520 and G bit 525 will be described in more detail below. Broadly speaking, B bit 510 may be used in special cases wherein multiple reaction points may be associated with a single traffic source, i.e., with a single source media access control ("MAC") address. H bit 515 can be used to specify whether a MAC address included in the CM tag (if any) is a hierarchical MAC address. I bit 520 may be used for instances in which an edge switch is not capable of supporting BCN reaction point functionality on all of its input ports. G bit 525 may be used to support cases wherein a congestion managed domain includes both DCE portions and at least one classical Ethernet ("CE") portion. This may be the case, for example, when a customer has partially upgraded a legacy Ethernet system to DCE.

Reserved field 530 is currently not used. The bits in this field may be set to predetermined values (e.g., to 0) on transmission and should be ignored on reception. Future versions of the BCN protocol may redefine all or some of the reserved bits. CPIDhsh field 535 contains the CPIDhsh value for the congested flow that has been copied by the reaction point from the appropriate register.

Timestamp field 540 may be used by a reaction point to estimate the round trip time from the congestion point with which the reaction point is associated. In this example, when a reaction point inserts an RLT in the CM tag of a frame that the reaction point is going to transmit, the current value of the reaction point's local free running timer is copied into timestamp field 540. Unit field 545 indicates the time units indicated in timestamp field 540.

As noted in the description of BCN frame 305 (with reference to FIG. 3), the destination address of a BCN frame is usually the source address of a sampled frame that caused a congestion point to generate the BCN frame. However, there are special cases in which using such an address for forwarding purposes may create problems.

Figure 6:
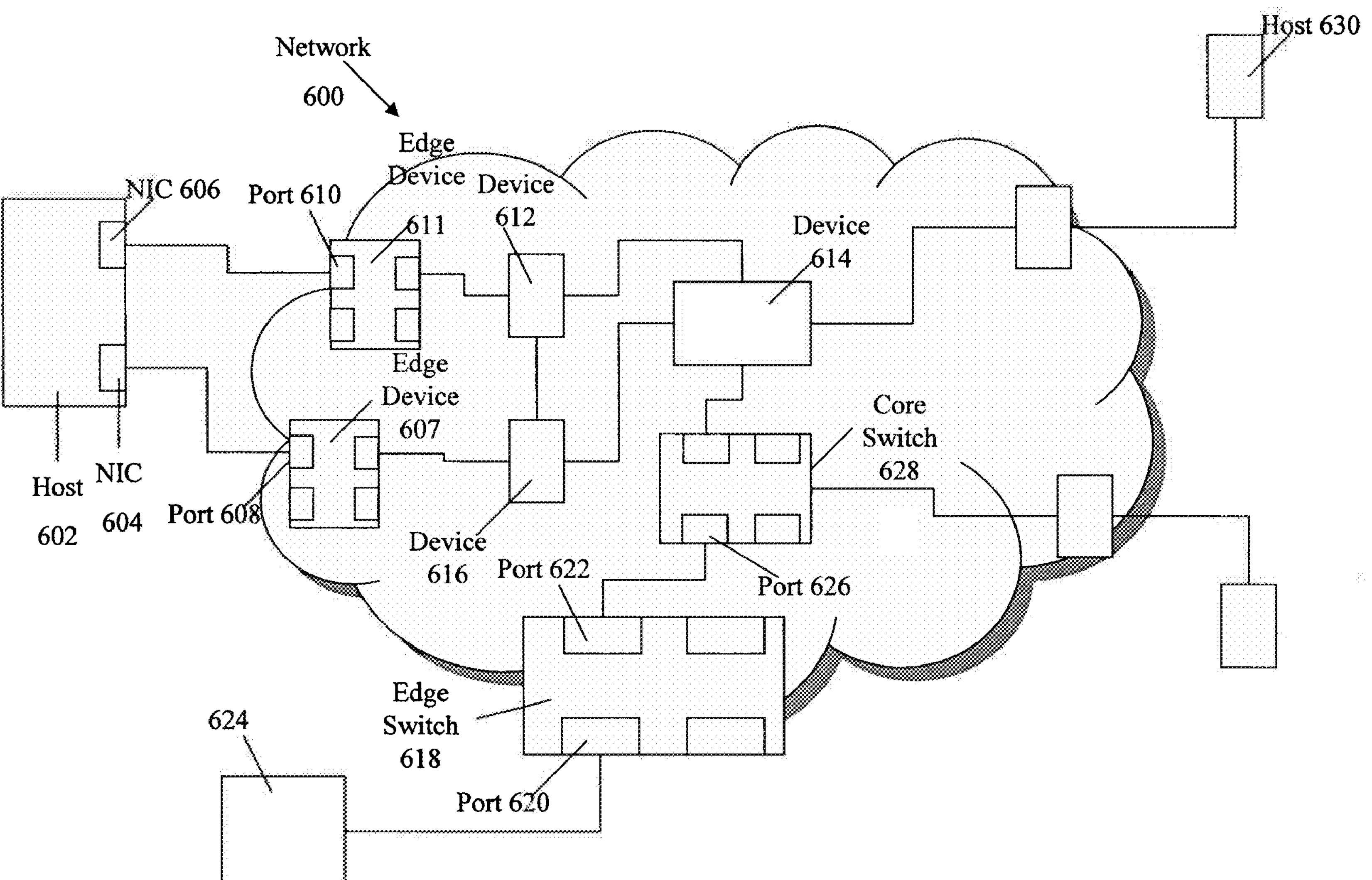
FIG. 6 is a network diagram that illustrates scenarios that may involve CM tags having the BCN address ("BCNA") option and/or the BCNA insert ("BCNAI") option.

One such example is illustrated in the network diagram of FIG. 6. As with other network diagrams depicted herein, the numbers and types of devices are purely shown by way of example. Similarly, the connections indicated in the network diagrams herein are merely examples; more or fewer connections may be formed, intervening devices may be involved, etc.

Here, host device 602 includes network interface cards ("NICs") 604 and 606, both of which are configured to be BCN reaction points. NIC 604 is configured for communication with BCN-enabled network 600 via edge device 607 and NIC 606 is configured for communication with edge device 611. However, host 602 has a single MAC address. Therefore, NICs 604 and 606 are associated with the same MAC address. This may be the situation, for example, when a host device supports EtherChannel technology.

In this example, core network device 614 is a congestion point and has detected congestion on a flow between NIC 606 and host device 630. Accordingly, network device 614 will form one or more BCN frames based on traffic between NIC 606 and host device 630. If network device 614 were to use the MAC address of host device 602 as the destination address for the BCN frame(s), the BCN frame could be sent to host device 602 via various paths. For example, the BCN frame might be sent to host device 602 via network devices 612 and 611. If so, a rate limiter would be installed in NIC 606, the proper reaction point. Alternatively, the BCN frame might be sent to host device 602 via network devices 616 and 607. If so, a rate limiter would be installed in NIC 604, which is not the proper reaction point.

To avoid such potential problems, some implementations of the invention allow a BCN Frame to be directed to a specific port of ingress. According to some such implementations, a BCN Address ("BCNA") option may be added to a CM tag.

Figure 7:
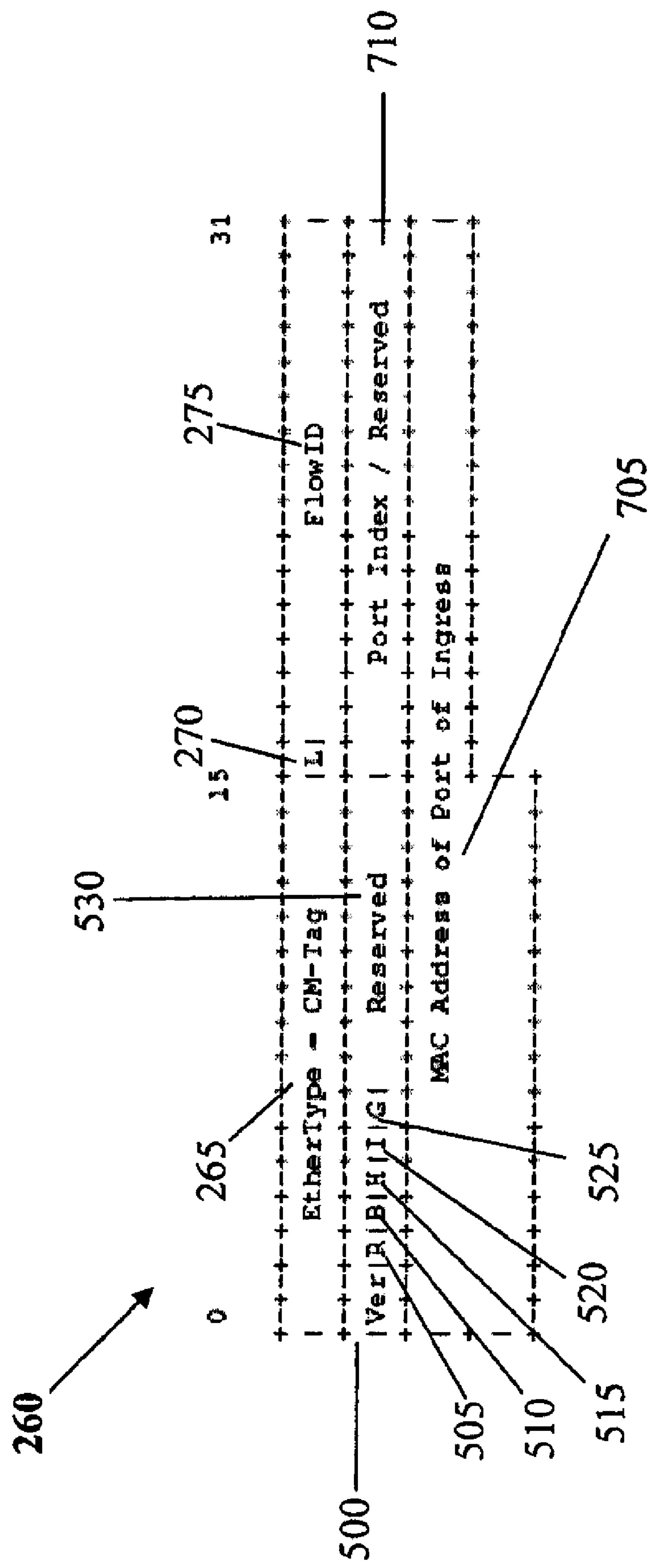
FIG. 7 provides an example of a CM tag that includes a BCNA option.

One such CM tag 260 having a BCNA option is shown in FIG. 7. In this example, L bit 270 is set to "1," indicating that additional CM tag fields follow FlowID field 275. Here, the BCNA option is indicated by setting B bit 510 to "1" in the CM tag of every frame entering BCN-enabled network through an Etherchannel or the like.

For example, ingress port 610 of FIG. 6 could add a CM tag having the BCNA option to all frames arriving from NIC 606. CM tag 260 carries enough information to identify the physical port of entry, which would be ingress port 610 in this example. When a congestion point (e.g., congestion point 614) samples a frame carrying a BCNA option in the CM tag, it will be able to direct a BCN frame to the proper port of ingress based on the information carried by the BCNA option.

In this example, every port belonging to an Etherchannel or the like will be directly addressable, either with a hierarchical MAC address in case of DCE networks or via a combination of a switch MAC address plus a Port Index in case of "classical Ethernet" networks. Referring again to FIG. 7, if the hierarchical MAC flag (H bit 515) in the CM tag is set, this indicates that MAC address field 705 contains a hierarchical MAC address and that Port Index/Reserved field 710 should be interpreted as being reserved. If H bit 515 is not set, then MAC address field 705 contains a non-hierarchical MAC address and Port Index/Reserved field 710 should be interpreted as being the index of the addressed port.

Figure 8:
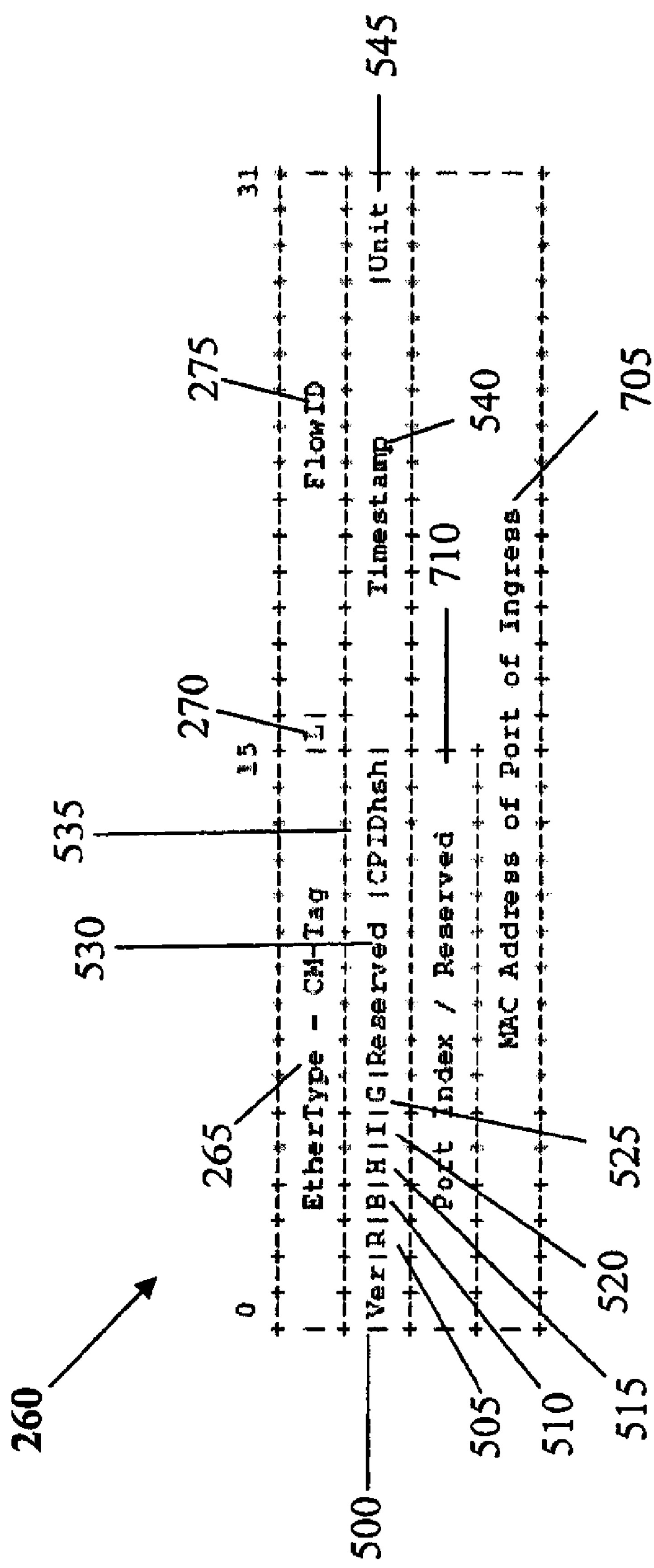
FIG. 8 depicts a CM tag that includes a BCNA option and an RLT option.

If a flow entering a BCN-enabled network from an Etherchannel (or the like) is subject to rate limitation, the frames of such flows preferably carry both options when they leave the rate limiter. BCNA and RLT options may be indicated in the same CM tag, e.g., as depicted in FIG. 8. Here, L bit 270 is set to "1," indicating that additional CM tag fields follow FlowID field 275. R bit 505 is set, indicating that this CM tag includes the RLT option. Accordingly, CM tag 260 includes CPIDhsh field 535 (containing the CPIDhsh value for the congested flow, plus timestamp field 540 and unit field 545.

B bit 510 is also set to 1, indicating that CM tag 260 also includes the BCNA option. The information in MAC Address field 705 and Port Index/Reserved field 710 will depend on whether H bit is set to 1, as noted above. In this example, the BCNA option follows the RLT option, but in other implementations this need not be the case.

There are instances in which an edge switch is not capable of supporting BCN reaction point functionality on some or all of its input ports. One such example is edge switch 618 of FIG. 6. Here, port 620 does not support BCN reaction point functionality. Edge switch 618 may, for example, be sourcing Fibre Channel traffic or classical Ethernet traffic. However, port 622 and core switch 628 support BCN functionality.

Figure 9:
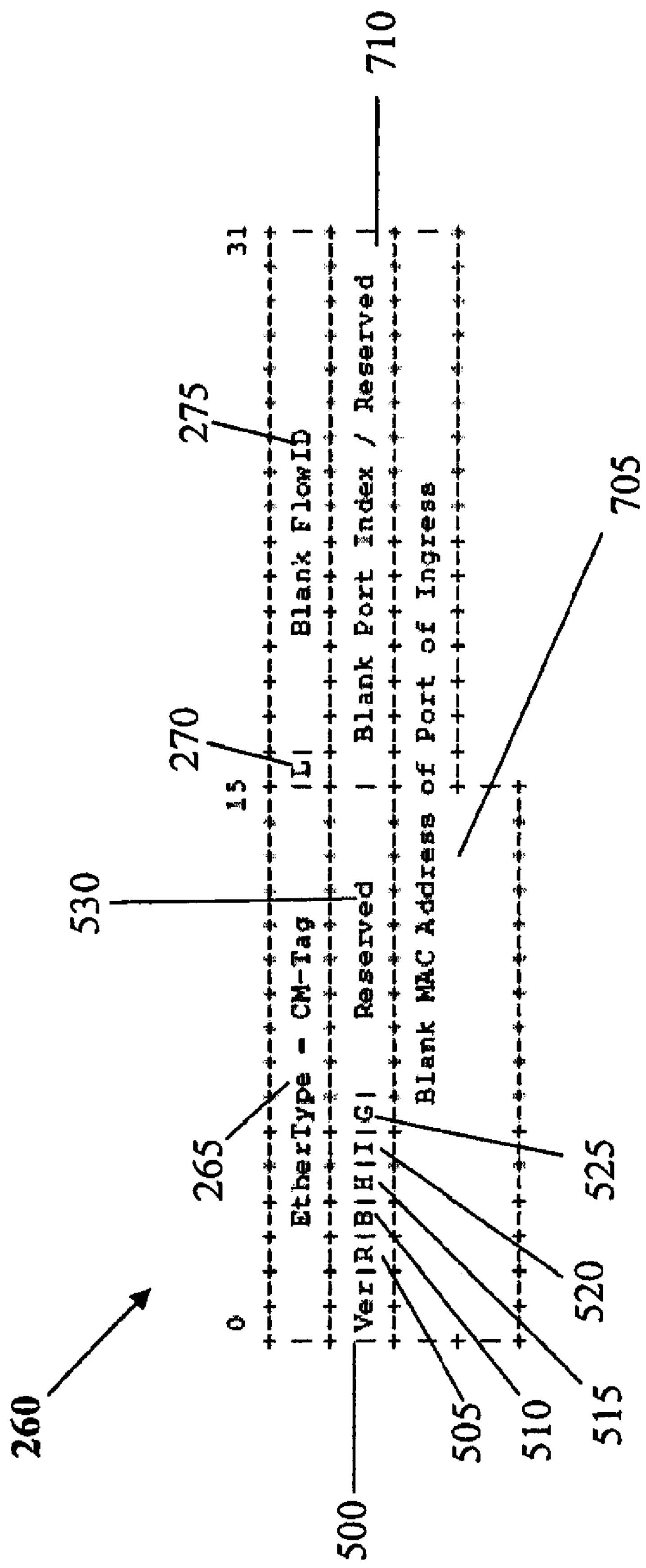
FIG. 9 provides an example of a CM tag that includes a BCNAI option.

Some implementations of the invention allow edge switch 618 to delegate the BCN termination to switch 628. This delegation may be achieved, for example, via the BCNA Insert ("BCNAI") option shown in FIG. 9. Egress port 622 of switch 618 indicates the BCNAI option for CM tags of outgoing frames by setting L bit 270, B bit 510 and I bit 520 to 1. In this example, FlowID field 275, MAC address field 705 and Port Index/Reserved field 710 are zeroed out. In alternative implementations, these fields may include other predetermined values that will be ignored by port 626.

When ingress port 626 of switch 628 receives frames carrying the BCNAI option, ingress port 626 replaces the BCNAI option with a BCNA option. Ingress port 626 sets I bit 520 to zero and inserts actual values in FlowID field 275, Port Index/Reserved field 710 and MAC address field 705. In this example, the value of MAC address field 705 will depend on whether "H" bit of the BCNAI option is set. If H=0 (regular Ethernet), MAC address field 705 will indicate the MAC address of switch 628. If H=1 (indicating the hierarchical MAC addressing of DCE), MAC address field 705 will indicate the hierarchical MAC address of port 620. BCN frames generated by sampling frames coming from edge switch 618 will be directed to the proper ingress port of switch 618.

In preferred implementations, the BCNAI option and the RLT option cannot coexist in the same CM tag. In such implementations, the combination of flags R=1, B=1, and I=1 is illegal. If a frame containing a BCNAI option in the CM-Tag is received by a CP, an exception flag should be raised and such frame should be dropped.

Figure 10:
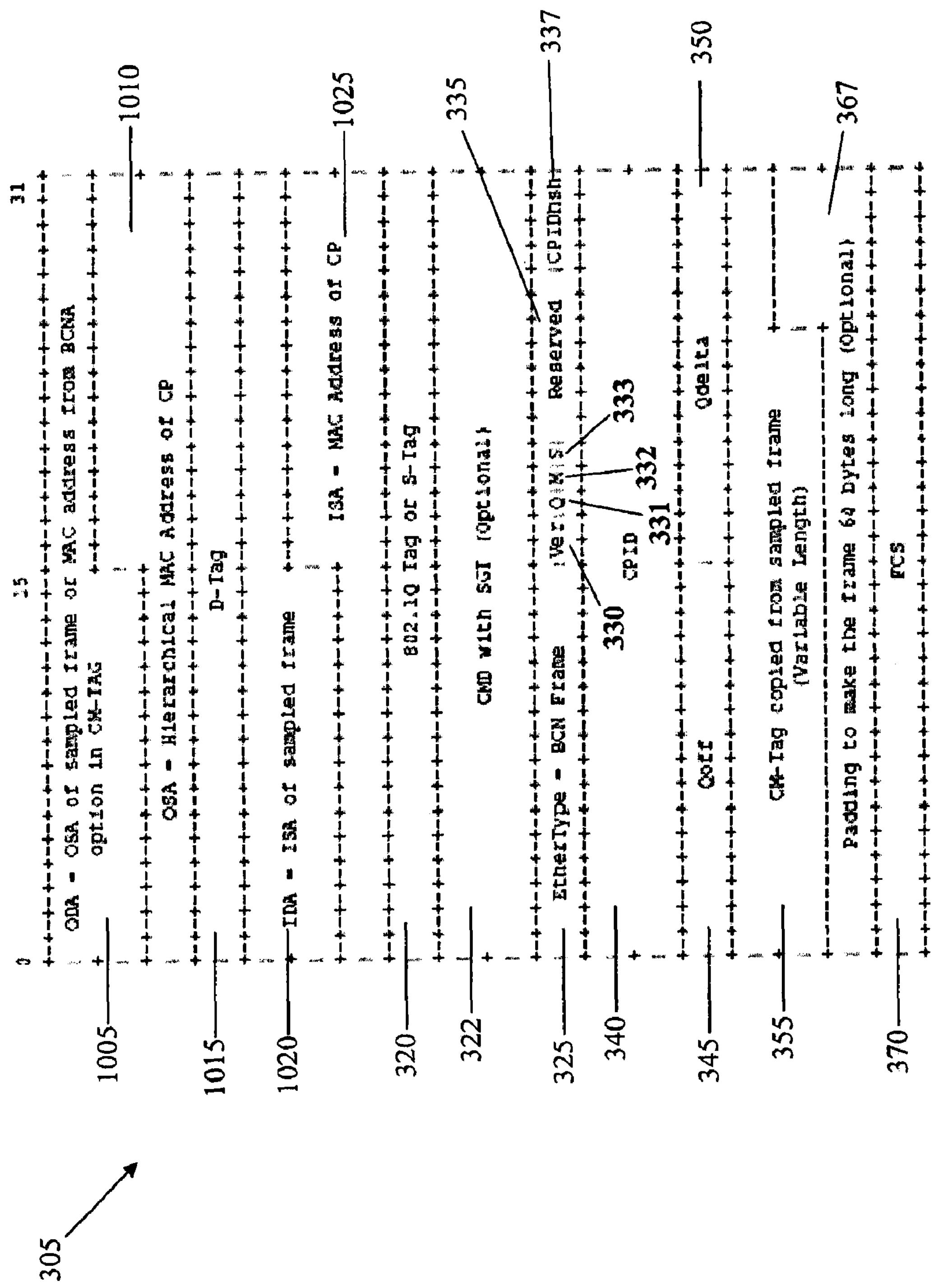
FIG. 10 illustrates an example of a BCN frame format that may be used for Mac-in-Mac encapsulation and hierarchical addressing.

FIG. 10 illustrates one example of a BCN Frame when DCE MAC-in-MAC encapsulation is used. Such methods may be implemented, for example, according to a conventional MAC-in-MAC scheme as described in IEEE standard draft 802.1ah or according to novel methods described in U.S. patent application Ser. No. 11/152,991, entitled "FORWARDING TABLE REDUCTION AND MULTIPATH NETWORK FORWARDING" and filed on Jun. 14, 2005, both of which are hereby incorporated by reference.

Outer destination address ("ODA") field 1005 of BCN frame 305 may be the outer source address ("OSA") of a sampled frame. Alternatively, ODA field 1005 may indicate the MAC address in the BCNA option, if such option is present in the CM tag carried by the sampled frame and if G bit 525 of the CM tag is set to zero. Outer source address ("OSA") field 380 contains the hierarchical MAC address of the congestion point that forms BCN frame 305. In this example, D-Tag field 1015 includes an FTag copied from the sampled DCE frame and a time-to-live ("TTL") field copied from a local register.

Inner destination address ("IDA") field 1020 indicates the inner SA of the sampled frame. Inner source address ("ISA") field 1025 indicates the (non-hierarchical) MAC address of the congestion point that forms BCN frame 305. 802.1Q/S-Tag field 320 may be copied from the sampled frame. The Priority field of 802.1Q/S-Tag field 320 may be set either to the priority of the sampled frame or to a configurable priority. It is preferable to use the highest priority in order to minimize the latency experienced by BCN Frames. The other fields of BCN frame 305 may be as described earlier with reference to FIG. 3.

Figure 11:
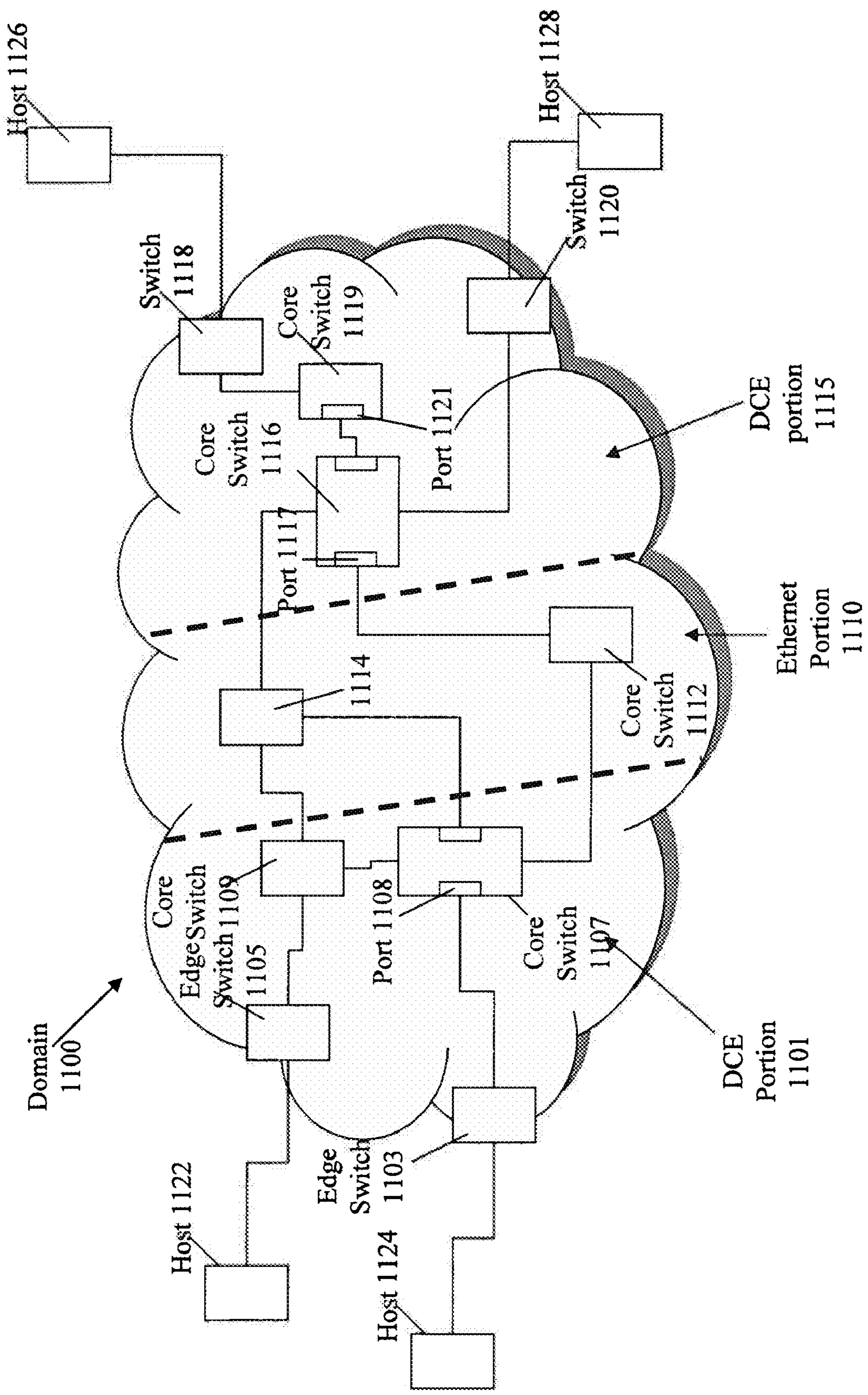
FIG. 11 is a network diagram that illustrates scenarios that may involve the use of the G bit in a CM tag.

Some additional implementations of the invention will now be described with reference to FIG. 11. In this example, congestion managed domain 1100 includes DCE portions 1101 and 1115, separated by classical Ethernet portion 1110. In other words, edge switches 1103 and 1105, as well as core switches 1107 and 1109, are configured for DCE functionality. Core switches 1116 and 1119, as well as edge switches 1118 and 1120, are also configured for DCE functionality. However, core switches 1112 and 1114 are configured for classical Ethernet functionality.

In this example, core switch 1107 receives an indication to trigger a BCNA option via port 1108. It may be, for example, that one or more ingress ports of edge switch 1103 are not configured to support BCN functionality, or that there are multiple reaction points in host device 1124 associated with a single MAC address. For whatever reason, port 1108 forms a CM tag having a BCNA option, e.g., as shown in FIG. 7. L bit 270 is set to "1," indicating that additional CM tag fields follow FlowID field 275. Port 1108 indicates the BCNA option by setting B bit 510 to "1". In this example, H bit 515 is also set to 1, because hierarchical MAC addressing is involved.

Because the hierarchical MAC addresses of a DCE network are dynamically generated, there may sometimes be hierarchical MAC addresses that are duplicated in DCE portions 1101 and 1115. In other words, it may sometimes be the case that one or more of the ports in DCE portion 1101 have the same hierarchical MAC address(es) as one or more of the ports in DCE portion 1115.

In this example, port 1108 of core switch 1107 has the same hierarchical MAC address ("A") as port 1117 of core switch 1116. Therefore, port 1108 includes hierarchical MAC address A in the CM tag. This could cause a BCN frame for flows that involve both core switch 1107 and core switch 1116 to be routed incorrectly, thereby imposing a rate limiter on the incorrect reaction point. For example, if core switch 1119 were a congestion point, this could cause a rate limiter to be applied in port 1117.

However, G bit 525 (the "iGnore" bit) can solve this potential problem. Port 1117 should be aware that it is connected to a classical Ethernet portion of the network. Port 1117 will also determine that the "H" bit of the CM tag has been set to 1, which indicates that the CM tag was formed by an upstream device that is part of a DCE portion of the network. Port 1117 also determines that the hierarchical MAC address in the CM tag matches its own hierarchical MAC address. Therefore, port 1117 sets G bit 525 to 1.

Because core switch 1119 is a congestion point for this flow, port 1121 will form a BCN frame addressed to hierarchical MAC address A. However, port 1117 will not terminate the BCN frame or set a rate limiter, because the G bit has been set. Instead, it will set the G bit to zero and forward the BCN frame to port 1108, which is the proper reaction point in this example. Even if the BCN frame does not exit DCE portion 1115 via port 1117, the G bit should still be set to zero when the BCN frame is about to leave DCE portion 1115 and enter classical Ethernet portion 1110 (e.g., if the BCN frame returns via core switch 1114).

Figure 12A:
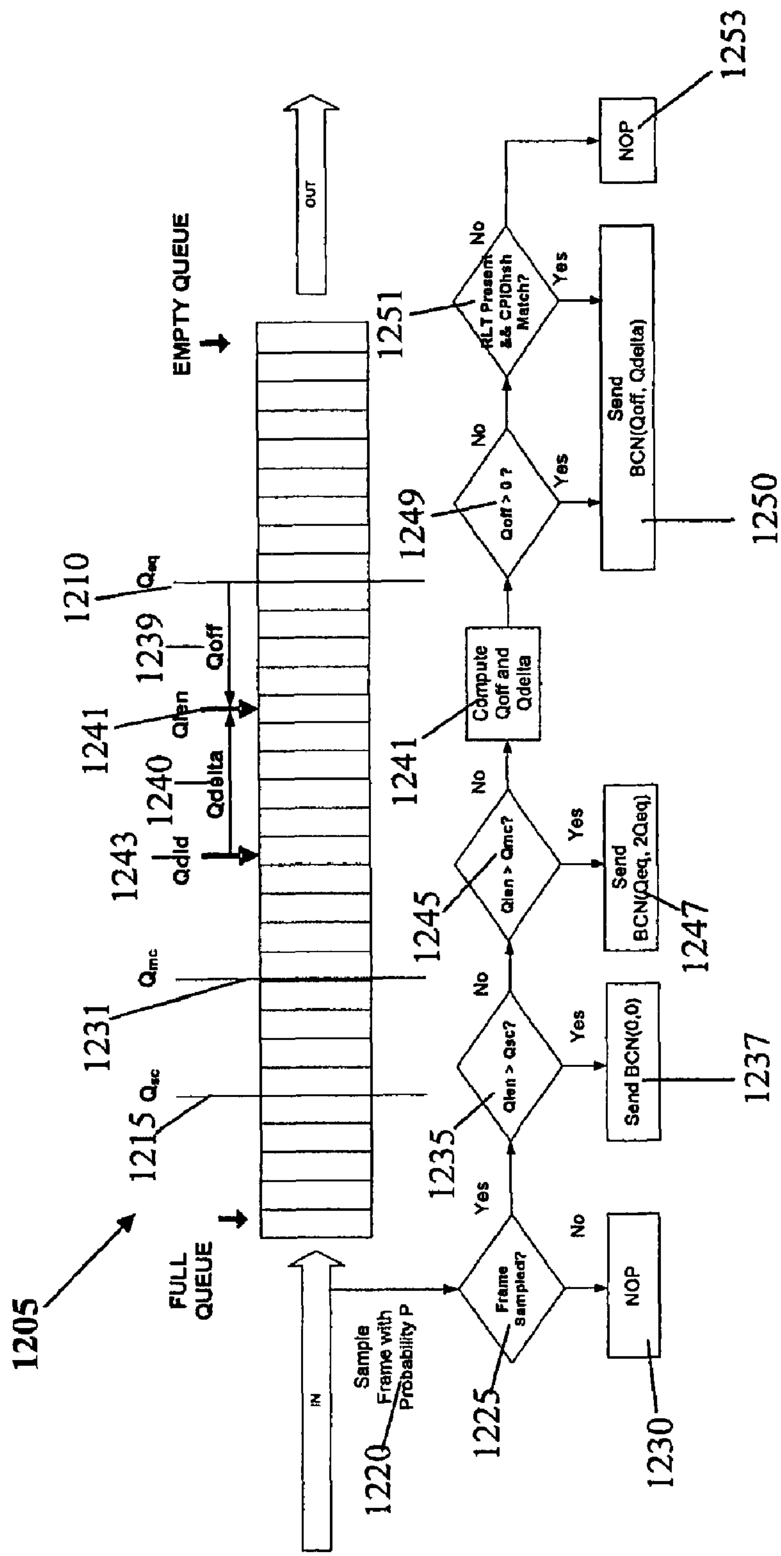
FIG. 12A illustrates processes of congestion detection and message generation at a congestion point.

Examples of methods for congestion detection and for generating BCN frames at a congestion point will now be described with reference to FIG. 12. Queue 1205 is a congestion point. An equilibrium threshold Qeq 1210 defines a desired operating point of a queue under congestion conditions. In other words, Qeq 1210 establishes a target level around which the length of queue 1205 should oscillate when congestion arises. A severe congestion threshold Qsc 1215 defines the level at which the queue is subject to extreme congestion conditions.

Here, a congestion point samples incoming frames with a probability P 1220. P 1220 is a configurable parameter, the selection of which may be a tradeoff between the usefulness of more frequent congestion detection and the overhead required for more frequent sampling and computation. In some preferred implementations, P 1220 is in the range of 0.01 to 0.1; in some such implementations, P 1220 is 0.01. The values of Qeq 1210, Qsc 1215 and P 1220 are preferably established before the other steps shown in FIG. 12 are performed.

A congestion point may sample on a byte arrival basis. That is, if the average frame length is E[L], then a congestion point may sample a frame, on average, for every E[L]/P bytes received. For example, given an average frame length of 1000 bytes, the average sampling rate may be one frame for every 100 KB of data received.

Figure 12B:
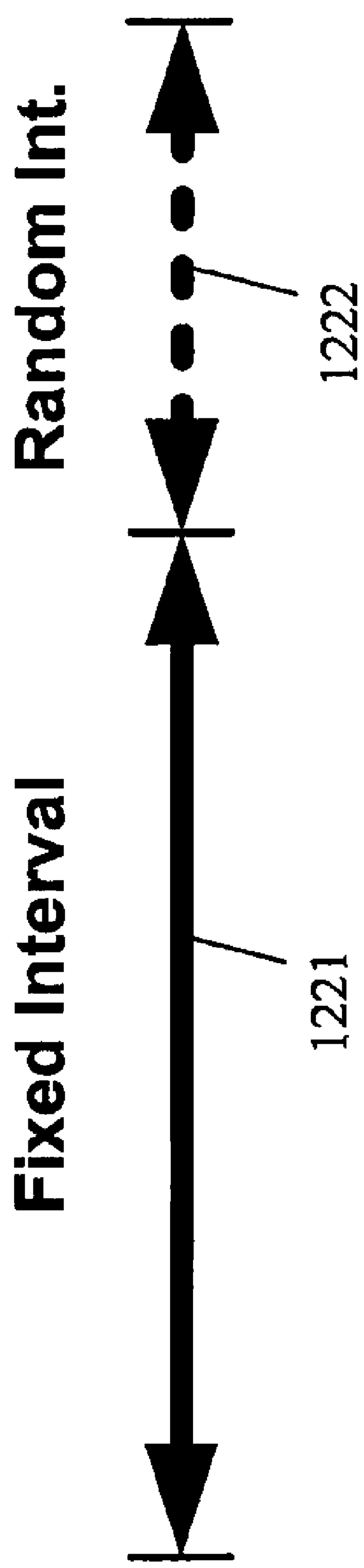
FIG. 12B illustrates a frame sampling method that may be used by a congestion point when performing some processes of FIG. 12A.

Some such methods may be implemented using a fixed interval followed by a variable interval, which may be a random interval. FIG. 12B illustrates an example of such intervals. Here, a fixed interval Sf 1221 is followed by variable random interval Sr 1222. Initially and after every sample, the sampling interval S may be calculated by the adding the two intervals: S=Sf+Sr.

The length of every frame carrying a non-zero FlowID in the CM-Tag that arrives at the queue is accumulated in L. The frame that makes L>=S is sampled. A new random interval Sr may then be picked and L may be set to zero. The fixed interval Sf may, for example, be configurable in the range [0, 256] KB. The random interval Sr may, for example, be generated in the range [0, 64] KB.

In step 1225, a congestion point determines whether or not to sample a frame. If no frame is sampled, no BCN frame will be generated at that moment. (Step 1230.)

According to some implementations, when the queue length is zero (0) or the queue length is above a mild congestion threshold Qmc 1231, the congestion point may increase the sampling probability by a factor Sscale, e.g., S may be divided by Sscale. For example, Sscale may be a power of 2. Preferably, BCN frames and all frames carrying a null FlowID in the CM-Tag are ignored by the sampling process, because they do not contribute to the increment of L. For example, frames pertaining to network control traffic may be ignored by the sampling process.

In this example, when a congestion point samples a frame, the congestion point compares the current queue length Qlen with a severe congestion threshold Qsc 1231. (Step 1235.) If Qlen is greater than Qsc, the congestion point determines that the queue is under severe congestion conditions. Here, a special BCN message, i.e., BCN(0,0), is generated. (Step 1237.) Such a message may, for example, cause a rate limiter to temporarily drop its rate to zero.

In this example, a BCN feedback message includes two fields, Qoff 1239 and Qdelta 1240. Qoff 1239 is an instantaneous measure of congestion, which in this example is the offset of the current queue length Qlen 1241 with respect to the equilibrium threshold Qeq 1210. Here, Qoff 1239 is saturated at +Qeq and −Qeq. In this example, a BCN feedback message also includes congestion change information. Here, the congestion change information is Qdelta 1240, which is the change in length of the queue since the last sampled frame. In this example, Qdelta 1240 is saturated at +2Qeq and −2Qeq. When Qdelta 1240 saturates, the Q bit in the BCN Frame is set. When Qoff and Qdelta are both zero, in some implementations no BCN message is generated. The message BCN(0,0) may have a special meaning: a “stop” BCN feedback message may be indicated by zero values for Qoff 1239 and Qdelta 1240, as described above with reference to step 1237.

If the congestion point determines in step 1245 that Qlen is below Qsc but above Qmc, in this example the congestion point generates a BCN message corresponding to maximum negative feedback. (Step 1247.) This message will cause the maximum rate decrement to occur at the rate limiter that receives such a message.

If the congestion point determines in step 1245 that Qlen is less than or equal to Qmc, in this example the congestion point calculates the values of Qoff 1239 and Qdelta 1240. Qdelta 1240 may be calculated according to various methods. In one such method, Qdelta 1240 is the difference between the current queue length Qlen 1241 and the queue length at the previous time of sampling (here, Qold 1243). In another such method, Qdelta 1240 is the difference between the number of packets (or other data units) added to the queue and the number of packets (or other data units) removed from the queue since the last time of sampling. The first method is more accurate but requires that an indication of the previous queue length be stored in memory. The second method requires a smaller amount of state to be kept, but may be prone to error accumulation.

Here, if the congestion point determines in step 1249 that Qoff 1239 is positive (i.e., if the congestion point determines that Qlen 1241 is greater than Qeq 1210), the congestion point generates a BCN message containing Qoff 1239 and Qdelta 1240. (Step 1250.) If the congestion point determines that Qoff 1239 is not positive, in this example the congestion point determines whether the CM tag of the sampled frame contains an RLT option and whether the CPIDhsh field matches the CPIDhsh associated with the queue. (Step 1251.) If so, the congestion point generates a BCN message containing Qoff 1239 and Qdelta 1240. (Step 1250.) If not, no BCN message is generated. (Step 1253.)

The rationale behind step 1251 is the following: if Qoff 1239 is positive, the Qlen 1241 is above the equilibrium level of Qeq 1210. Therefore a BCN message should be generated. Otherwise, the queue may be emptying out, or may be filling up but may not yet have reached the equilibrium threshold. In such cases, a BCN message should preferably be generated only on those flows that are currently rate limited and associated with this particular congestion point. This check is desirable to reduce as much as possible the generation of “false positive” BCN messages, i.e., positive BCN messages for non rate-limited flows, or for rate limited flows associated with other congestion points.

Figure 13:
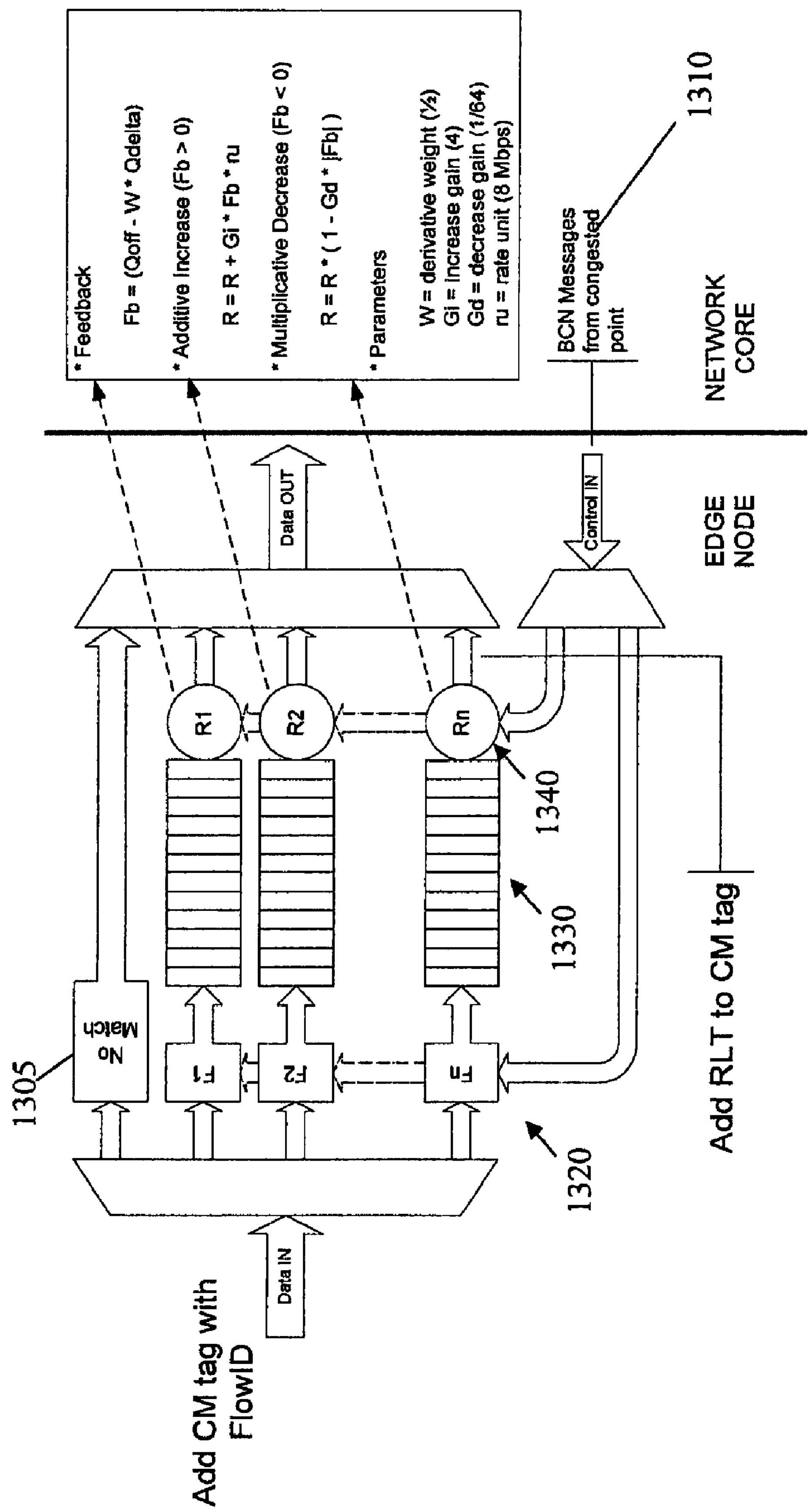
FIG. 13 illustrates an example of a data path structure of a reaction point.

FIG. 13 illustrates the structure of the data paths of a reaction point according to some implementations of the invention. This process may be implemented, for example, in an ingress port of an edge switch or in an egress port of the network interface card ("NIC") of a host device. Data path 1305 represents a condition of the reaction point before any BCN frames have been received indicating congestion that pertains to this reaction point, e.g., as in the state of edge device 110 in FIG. 2A. In data path 1305, data frames, like those of data frames 210 of FIG. 2A, are transmitted by the reaction point with a "short form" CM tag, indicating no known congestion for the flow.

After BCN frames have been received indicating congestion that pertains to this reaction point (e.g., as in the state of edge device 110 in FIG. 2B), a set of filters 1320, F1 through Fn, divert the traffic that matches a particular filtering criterion (e.g., a match of CPIDhsh values) from data path 1305 to a set of queues. Traffic is drained from such queues by a set of corresponding rate limiters 1340, R1 through Rn, whose rate is controlled by the BCN Frames coming from congestion points. Besides controlling the rate of traffic, in this implementation the rate limiters also cause an RLT option to be added to all the CM tags in the frames they transmit, in order to elicit feedback from the congestion points. To ensure that the feedback is generated only by the congestion point that originally caused the instantiation of the filter, the RLT option contains the identity of such congestion point (e.g., indicated in the CPIDhsh field). Congestion points should include their identity in every BCN Frame they generate, so that each of filters 1320 may be associated with individual congestion points.

According to some implementations of the invention, the rate control algorithm used by rate limiters 1340 works according to a Feedback Signal Fb that is calculated, e.g., according to Equation (1):

$$Fb=-(Q\mathrm{off}+w\cdot Q\mathrm{delta}) \quad \text{Equation (1)}$$

In Equation (1), w is a parameter used to weight the derivative component Qdelta (which is also referred to herein as the congestion change component or the like) more or less with respect to the offset component Qoff (which is also referred to herein as the instantaneous measure of congestion or the like). The values of Qoff and Qdelta are determined from BCN frames received by a reaction point. Based on the sign of the Feedback Signal Fb, in some implementations of the invention the rate R is increased or decreased as follows:

$$\text{If } Fb>0 \quad R=R+Gi\cdot Fb\cdot Ru \quad \text{Equation (2)}$$

$$\text{If } Fb<0 \quad R=R\cdot(1-Gd\cdot|Fb|) \quad \text{Equation (3)}$$

If Fb=0, R is unchanged. Here, Gi and Gd are the Increase Gain and Decrease Gain respectively, and Ru is the Rate Unit (i.e., the granularity of the rate adjustment) employed by the rate limiters. In one example, Gi=1, Ru=8 Mbps and Gd=1/64. However, these values are merely examples and the variables of Equations (2) and (3) may be optimized according to the implementation. The calculations are preferably done in the reaction point. In alternative implementations, the calculations are done elsewhere, e.g., in the detection point. However, if the calculations are performed in a location other than the reaction point, the most effective use of timestamps will be inhibited.

It will be observed that in implementations that use equations in the general form of Equations (2) and (3) to control changes in R, the rates are decreased more aggressively when Fb<0 (a multiplicative decrease) than the rates are increased when Fb>0 (an additive increase). This is desirable in order to avoid filling the buffers of a congestion point too quickly due to a slow response to detected congestion or due to a too-rapid increase in flow when congestion is abating.

A limited number of filters/rate limiters may be available. There may be cases when all the filters have been used and a BCN message is received which should cause the instantiation of a new filter/rate limiter pair. In such cases, a number of actions may be taken, e.g.: (1) aggregate all the filters/rate limiters in a single filter/rate limiter that controls the entire traffic originated by and end system; (2) aggregate filters/rate limiters in an "intelligent" way, e.g., use the same filter/rate limiter for all the traffic flows sharing the same destination address, etc; or (3) aggregate filters/rate limiters in a "less intelligent" way, e.g., use the same filter/rate limiter for all the traffic flows sharing the same bucket based on an hash function of the frame header.

When a reaction point receives a BCN Frame, the difference between the current time and the time indicated in the timestamp field of the BCN Frame is calculated. This difference is the last measure of the round trip time between the reaction point and the congestion point. This measure may be averaged out (for example using an Exponential Weighted Moving Average similar to the one used in weighted random early detection ("WRED") schemes) and used to dynamically adjust the value of some of the reaction parameters. For example, a reaction point may have a number of tables containing different values of the w, Gi, and Gd parameters precalculated based on different round-trip times. The current value of the averaged round-trip time may be used to select the table of parameters that best suite the current loop delay.

Once a rate limiter has been instantiated, it may be reclaimed once two conditions are satisfied: (1) the queue of the rate limiter is empty, and (2) its rate is at or above the line-rate. These two conditions are necessary to avoid out of order packet delivery.

Each rate limiter is associated with a timer that is reset every time a BCN Frame is received. If this timer expires, it means that the corresponding rate limiter has not received BCN Frames for the entire duration of the timeout period. This may happen, for example, because the traffic stream that that rate limiter was controlling has suddenly ended. Alternatively, this may occur because routing issues in the network are preventing BCN Frames from reaching the reaction point. To reclaim a rate limiter that may potentially be stale, various implementations of the invention employ a variety of solutions. In some implementations, the rate limiter is immediately freed up at the timeout expiration. In other implementations, the rate of the rate limiter starts automatically increasing when the timer expires. This increase may continue, for example, until the conditions for the filter reclaiming are met or BCN frames are eventually received. In other implementations, management software is notified (e.g., via an interrupt) of the anomaly and the management software is allowed to deal with the issue.

Rate limiters use a certain amount of buffer space to store frames held in their queues. Therefore, an active queue management mechanism may advantageously be used to prevent such buffers from overflowing. Traditional AQM techniques such as RED do not work well in such conditions because of the limited buffer and flow dynamics. An alternative AQM algorithm of the present invention may be implemented as follows. First, a threshold $Q_{aqm}$ is associated with the rate limiter queues. If the length of a rate limiter queue is below the $Q_{aqm}$ threshold, no action is taken. If the length of the rate limiter is above the $Q_{aqm}$ threshold, a packet is dropped/marked with a certain fixed probability (e.g., a probability in the range of 0.1 to 0.001).

If reactive and non-reactive flows (such as TCP and UDP flows) are sharing the same rate limiter queue, two separate packet counters are introduced. One packet counter is used for counting reactive packets in and the other for non-reactive packets stored in the queue. The AQM algorithm described in the previous paragraph could be implemented in the same way, except that for non-reactive flows the drop probability is 1.

An active filter 1320 may change its association with a congestion point over time. The association can be changed when a negative BCN Frame is received from a congestion point different from the one currently associated with the filter. For example, if a traffic flow is subject to congestion at congestion point CP1 (and therefore is filtered and rate-controlled according to feedback from CP1) starts experiencing congestion at congestion point CP2, CP2 will generate negative a BCN frame for that flow, causing its filter to change association from CP1 to CP2. After some time, the negative feedback generated by one of the two congestion points will prevail and the filter will settle its association with that congestion point.

When a congestion point is subject to severe congestion, it may send a "stop" BCN feedback message. Such a message is also referred to herein as a "BCN0" message or the like because in some implementations a "stop" BCN feedback message is a BCN message with Qoff=0 and Qdelta=0.

Figure 14:
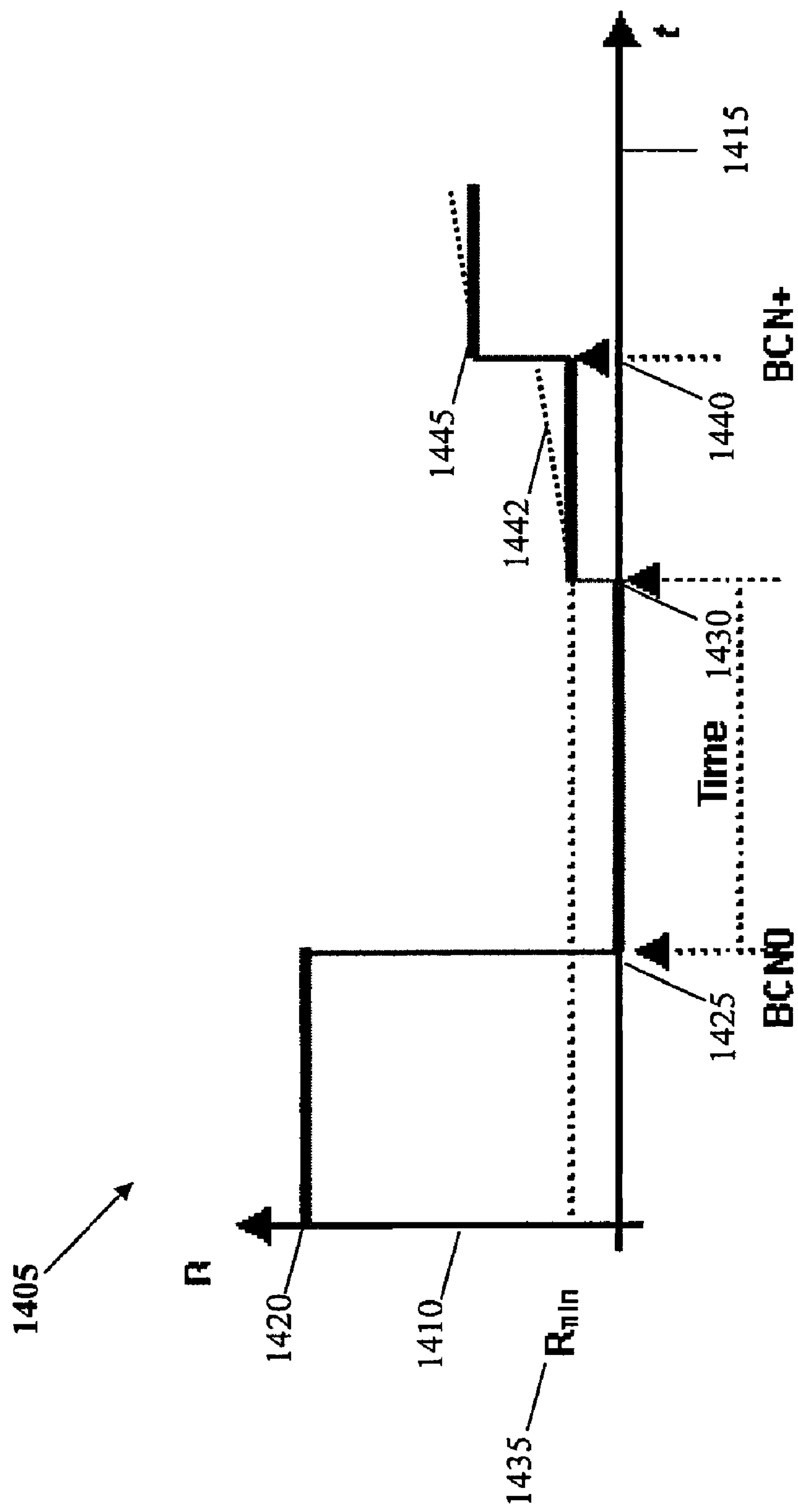
FIG. 14 is a graph that illustrates examples of timeout and restart at a reaction point.

Referring now to graph 1405 of FIG. 14, transmission rates are indicated with respect to vertical axis 1410 and time is indicated with respect to horizontal axis 1415. When a rate limiter receives a "stop" BCN feedback message (at time 1425), in some implementations of the invention it sets its current rate 1420 to 0 and starts a timer, e.g., a random timer whose range is determined by time Tmax (e.g., 10 us). When the timer started by the BCN0 message expires, the rate limiter is set to operate at a minimum rate 1435, which is a minimum rate $R_{min}$ in this example (e.g., 1/10 of line rate). This should restart the traffic flow towards the congestion point and trigger feedback, hopefully positive feedback. In this example, the slow restart leads to positive feedback from the congestion point at time 1440 and a subsequent increase in R to rate 1445.

After the timer expiration, Tmax is doubled and Rmin is halved, so that the next BCN0 will cause the random timer to have a longer duration and the rate limiter to restart from a slower rate, effectively realizing an exponential back-off. The initial values of Tmax and Rmin are restored upon the reception of the first positive feedback. During the timeout period, i.e., while the random timer is running, all BCN messages, including BCN0, should be ignored.

The same timer may be used if, for any reason, the rate of a rate limiter becomes smaller that $R_{min}$. When this happens, the random timer is started. When it expires, the rate of the rate limiter is set to $R_{min}$.

Special handling of the BCN message may be required when any of the Q bits are set in the BCN Frame. When a Q bit is set, the Qdelta parameter is saturated at 2Qeq or −2Qeq. When this happens, a stronger rate adjustment must be performed because the system is working outside of the linear region. The saturation feedback signal may be calculated as follows:

$$Fb_{sat} = -2\cdot\left(\frac{Qdelta}{2} + w\cdot Qdelta\right)$$

The rate adjustment is then performed as usual, i.e.:

$$\text{If } Fb_{sat}>0\ R=R+Gi\cdot Fb_{sat}\cdot Ru$$

$$\text{If } Fb_{sat}<0\ R=R\cdot(1-Gd\cdot|Fb_{sat}|)$$

In this example, the saturation feedback generates a rate adjustment twice as big as the maximum rate adjustment.

It will often be the case that a queue considered herein is part of a VOQ system wherein an unpredictable number of queues may be sharing a common buffer at any given time. In such circumstances, it may be beneficial to tune or modify the previously-described methods of the present invention according to the state of the VOQ system and the associated buffer. The larger the number of VOQs sharing the same physical or logical buffer, the lower the equilibrium threshold Qeq should be kept. Accordingly, some implementations of the invention provide a dynamic equilibrium threshold Qeq that responds to such conditions by decreasing Qeq as the number of active VOQs increases and increasing Qeq as the number of active VOQs decreases.

Moreover, the more that a common buffer is congested, the stronger the reaction implemented by the reaction points should be. In some implementations of the invention, the overall occupancy of a buffer will override the previously-described methods for implementing BCN messages according to indications from individual queues. One such implementation will now be described with reference to FIG. 15.

Figure 15:
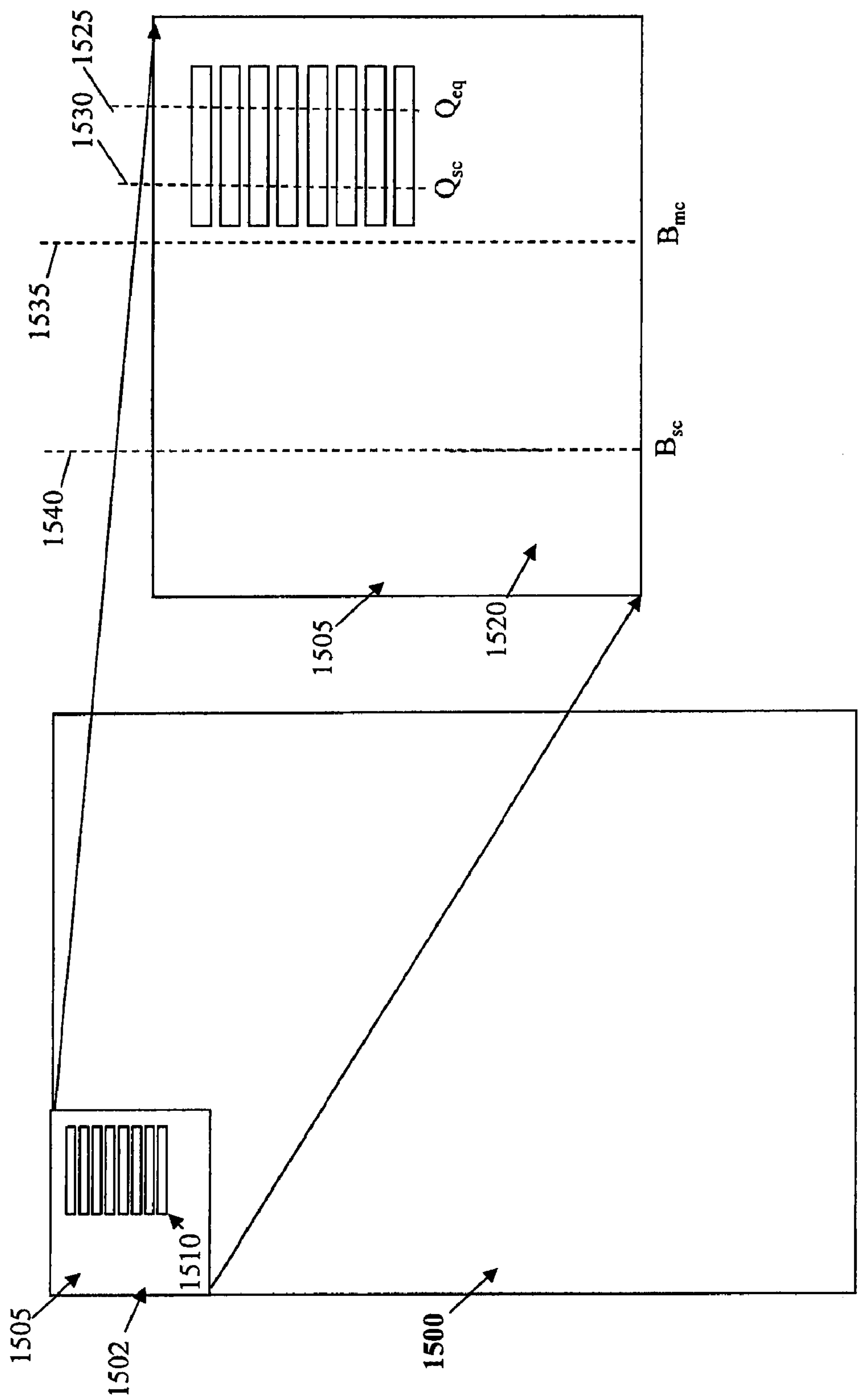
FIG. 15 depicts an alternative implementation for congestion points having input buffers that are shared by a number of output queues.

FIG. 15 depicts core switch 1500 having an input buffer 1505 for port 1502. Core switch 1500 is a congestion detection point. Here, input buffer 1505 is shared by a number of output queues 1510. When the overall occupancy of buffer 1505 reaches a predetermined level, "slow down" or "stop" BCN indications will result, even when no individual queue is experiencing congestion.

In this example, when the occupancy of buffer 1505 increases beyond mild congestion threshold ("$B_{mc}$"), the M bit will be set in the BCN frame (e.g., in reserved area 335 of frame 305 (see FIG. 3)). The reaction point (e.g., an edge switch) will detect that the M bit has been set and, in this example, will double the effect of any negative feedback. Positive feedback sent from a congestion point according to the condition of an individual queue with the M bit set will be ignored.

When the severe congestion threshold ("$B_{sc}$") is crossed, the S bit will be set in the BCN frame. If the reaction point detects that the S bit has been set, the reaction point will translate any corresponding BCN indication to be a "stop" BCN indication and will respond accordingly.

Other Embodiments

Although illustrative embodiments and applications of this invention are shown and described herein, many variations and modifications are possible which remain within the concept, scope, and spirit of the invention, and these variations would become clear to those of ordinary skill in the art after perusal of this application.

Accordingly, the present embodiments are to be considered as illustrative and not restrictive, and the invention is not to be limited to the details given herein, but may be modified within the scope and equivalents of the appended claims.

We claim:

1. A method, comprising:

receiving by a first network device a Backwards Congestion Notification (BCN) frame from a congestion point, wherein the BCN frame that is received indicates information pertaining to congestion for a flow associated with a source address and a destination address;

receiving a frame at an ingress port of the first network device;

determining a source address and a destination address of the frame by the first network device;

determining by the first network device that the source address of the frame is equal to the source address identified in the BCN frame, and that the destination address of the frame is equal to the destination address identified in the BCN frame;

calculating a flow hash based at least upon the source address and the destination address by the first network device;

forming a congestion management ("CM") tag that includes the flow hash and additional information pertaining to the congestion for the flow associated with the source address and the destination address;

inserting the CM tag in the frame by the first network device; and forwarding the frame by the first network device to the destination address;

wherein the BCN frame that is received indicates a manner in which traffic associated with the flow identified by the source address and the destination address is to be handled by another network device receiving the BCN frame;

wherein the another network device is an edge switch and the congestion point is a core switch.

2. The method of claim 1, further comprising determining a virtual local area network value of the frame, wherein the calculating step comprises calculating the flow hash based upon the source address, the destination address and the virtual local area network value.

3. The method of claim 1, further comprising determining whether a BCN frame has recently been received for the identified flow.

4. The method of claim 1, wherein the forming further comprises including a backwards congestion notification ("BCN") address in the CM tag, wherein the BCN address comprises an address of the ingress port.

5. The method of claim 1, wherein the ingress port is not configured to provide backwards congestion notification ("BCN") reaction point functionality and wherein an egress port of the first network device is configured to provide BCN reaction point functionality, further comprising forming, by the egress port, an indication for an ingress port of a second network device to add a BCN address in the CM tag.

6. The method of claim 3, wherein it is determined that a recent indication of congestion has been received for the identified flow, the method further comprising determining congestion point information identifying the congestion point, wherein the forming further comprises including the congestion point information identifying the congestion point in the CM tag.

7. The method of claim 4, wherein the forming further comprises including an indication in one or more bits of the CM tag, the indication when in a first state indicating that the BCN address comprises a Media Access Control (MAC) hierarchical address, and the indication when in a second state indicating that the BCN address is a combination of a MAC address and a port index.

8. The method of claim 6, wherein determining congestion point information comprises retrieving a stored congestion point identification hash value.

9. An apparatus, comprising:

a network interface system comprising at least one input port configured for receiving frames; and a logic system comprising at least one logic device configured to perform the following functions:

receiving a Backwards Congestion Notification (BCN) frame from a congestion point, wherein the BCN frame that is received indicates information pertaining to congestion for a flow associated with a source address and a destination address;

determining a source address and a destination address of a frame received at an ingress port;

determining that the source address of the frame is equal to the source address identified in the BCN frame, and that the destination address of the frame is equal to the destination address identified in the BCN frame;

calculating a flow hash based at least upon the source address and the destination address;

forming a congestion management ("CM") tag that includes the flow hash and additional information pertaining to the congestion for the flow associated with the source address and the destination address;

inserting the CM tag in the frame; and forwarding the frame to the destination address.

10. The apparatus of claim 9, wherein the logic system is further configured to determine a virtual local area network value of the frame and wherein the calculating function comprises calculating the flow hash based upon the source address, the destination address and the virtual local area network value.

11. The apparatus of claim 9, wherein the logic system is further configured to determine whether a backwards congestion notification ("BCN") frame has recently been received for the identified flow, wherein the CM tag indicates whether the apparatus has recently received an indication of congestion for the flow from the congestion point.

12. The apparatus of claim 9, wherein the forming function further comprises including a backwards congestion notification ("BCN") address in the CM tag, wherein the BCN address comprises an address of the ingress port.

13. The apparatus of claim 9, wherein the ingress port is not configured to provide backwards congestion notification ("BCN") reaction point functionality and wherein an egress port of the apparatus is configured to provide BCN reaction point functionality, further comprising forming, by the egress port, an indication for an ingress port of another apparatus to add a BCN address in the CM tag.

14. The apparatus of claim 11, wherein the logic system determines that a recent indication of congestion has been received for the identified flow, wherein the logic system is further configured to determine congestion point information identifying the congestion point, wherein the forming function further comprises including the congestion point information identifying the congestion point in the CM tag.

15. The apparatus of claim 12, wherein the forming function further comprises including an indication in one or more bits of the CM tag, the indication when in a first state indicating that the BCN address comprises a Media Access Control (MAC) hierarchical address, and the indication when in a second state indicating that the BCN address is a combination of a MAC address and a port index.

16. The apparatus of claim 14, further comprising a memory, wherein determining congestion point information comprises retrieving a stored congestion point identification hash value that identifies the congestion point from the memory.

17. An apparatus, comprising:

means for receiving a Backwards Congestion Notification (BCN) frame from a congestion point, wherein the BCN frame that is received indicates information pertaining to congestion for a flow associated with a source address and a destination address;

means for receiving a frame at an ingress port of a first network device;

means for determining a source address and a destination address of the frame;

means for determining that the source address of the frame is equal to the source address identified in the BCN frame, and that the destination address of the frame is equal to the destination address identified in the BCN frame;

means for forming a congestion management ("CM") tag that identifies the flow and includes additional information pertaining to the congestion for the flow associated with the source address and the destination address;

means for inserting the CM tag in the frame; and means for forwarding the frame to the destination address;

wherein the BCN frame that is received indicates a manner in which traffic associated with the flow identified by the source address and the destination address is to be handled by another network device receiving the BCN frame;

wherein the another network device is an edge switch and the congestion point is a core switch.

18. The method of claim 1, wherein the BCN frame indicates a level of congestion for the flow.

19. The method of 1, wherein the CM tag contains congestion point identification data identifying the congestion point from which the BCN frame was received.

20. The method of claim 1, wherein the BCN frame indicates a condition of mild or severe congestion for the flow.

21. The method of claim 1, wherein the BCN frame includes information pertaining to congestion at the congestion point.

22. The method as recited in claim 21, further comprising:

providing at least a portion of the information pertaining to the congestion at the congestion point in the CM tag prior to forwarding the frame to the destination address.

23. The apparatus as recited in claim 9, wherein the BCN frame that is received indicates a manner in which traffic associated with the flow identified by the source address and the destination address is to be handled by another network device receiving the BCN frame.

24. The apparatus as recited in claim 23, wherein the another network device is an edge switch and the congestion point is a core switch.

25. An apparatus, comprising:

a processor; and a memory, at least one of the processor or the memory being configured to perform the following functions:

receiving a Backwards Congestion Notification (BCN) frame from a congestion point, wherein the BCN frame that is received indicates information pertaining to congestion for a flow associated with a source address and a destination address;

receiving a frame at an ingress port of a first network device;

determining a source address and a destination address of the frame;

determining that the source address of the frame is equal to the source address identified in the BCN frame, and that the destination address of the frame is equal to the destination address identified in the BCN frame;

forming a congestion management ("CM") tag that identifies the flow and includes additional information pertaining to the congestion for the flow associated with the source address and the destination address;

inserting the CM tag in the frame; and forwarding the frame to the destination address;

wherein the BCN frame that is received indicates a manner in which traffic associated with the flow identified by the source address and the destination address is to be handled by another network device receiving the BCN frame;

wherein the another network device is a first edge switch and the congestion point is a core switch.

26. A method, comprising:

receiving a Backwards Congestion Notification (BCN) frame from a congestion point, wherein the BCN frame that is received indicates information pertaining to congestion for a flow associated with a source address and a destination address;

receiving a frame at an ingress port of a first network device;

determining a source address and a destination address of the frame;

determining that the source address of the frame is equal to the source address identified in the BCN frame, and that the destination address of the frame is equal to the destination address identified in the BCN frame;

forming a congestion management ("CM") tag that identifies the flow and includes additional information pertaining to the congestion for the flow associated with the source address and the destination address;

inserting the CM tag in the frame; and forwarding the frame to the destination address;

wherein the BCN frame that is received indicates a manner in which traffic associated with the flow identified by the source address and the destination address is to be handled by another network device receiving the BCN frame.

27. The method as recited in claim 26, further comprising:

determining congestion point information identifying the congestion point from the BCN frame, wherein the forming further comprises including an identifier of the congestion point in the CM tag to elicit feedback from the congestion point.

28. The method as recited in claim 27, wherein the congestion point is a core switch and the method is performed by an edge device.

29. The method as recited in claim 26, wherein the frame is not a BCN frame.

30. The method as recited in claim 26, wherein the frame is a data frame.

31. The method as recited in claim 1, wherein the CM tag includes a code that indicates that the CM tag pertains to congestion management.

32. The method as recited in claim 1, wherein the CM tag indicates whether the first network device has recently received an indication of congestion for the flow from the congestion point.

33. The method as recited in claim 1, wherein the CM tag indicates whether BCN reaction point functionality is implemented on all input ports of the first network device.

34. The method as recited in claim 1, wherein the CM tag includes one or more bits to include information pertaining to a congestion managed domain that includes Data Center Ethernet (DCE) portions and at least one classical Ethernet portion.

35. The method as recited in claim 1, wherein the BCN flame when in a first state is a positive BCN feedback message indicating that the congestion has improved or has dissipated.

36. The method as recited in claim 1, wherein the BCN flame when in a first state indicates that the first network device should increase a rate at which traffic associated with the flow is to be transmitted.

37. The method as recited in claim 1, wherein the BCN flame includes one or more bits that indicate a condition of mild congestion when the one or more bits are in a first state, and indicate a condition of severe congestion when the one or more bits are in a second state.

38. A method, comprising:

receiving a frame at an ingress port of the first network device;

determining a source address and a destination address of the frame;

calculating a flow hash based at least upon the source address and the destination address by the first network device;

forming a congestion management ("CM") tag that includes the flow hash, wherein the forming includes providing a backwards congestion notification ("BCN") address in the CM tag, wherein the BCN address includes an address of the ingress port;

inserting the CM tag in the frame by the first network device;

forwarding the frame by the first network device to the destination address; and receiving by the first network device a BCN frame from a congestion point, wherein the BCN frame is received at the ingress port identified in the CM tag of the frame, wherein the BCN frame that is received indicates information pertaining to congestion for the flow associated with the source address and the destination address, wherein the BCN frame that is received indicates a manner in which traffic associated with the flow identified by the source address and the destination address is to be handled by another network device receiving the BCN frame;

wherein the another network device is an edge switch and the congestion point is a core switch.

39. The method as recited in claim 27, further comprising:

receiving one or more additional BCN frames from the congestion point, the one or more additional BCN frames including congestion change information and at least one measure of congestion, the congestion change information and the at least one measure of congestion pertaining to the flow associated with the source address and the destination address.

40. The method as recited in claim 1, wherein at least a portion of the additional information pertaining to the congestion for the flow associated with the source address and the destination address is obtained from the BCN frame.

41. The method as recited in claim 26, wherein at least a portion of the additional information pertaining to the congestion for the flow associated with the source address and the destination address is obtained from the BCN frame or has previously been obtained from another BCN frame.

* * * * *